US006918106B1

(12) United States Patent
Burridge et al.

(10) Patent No.: US 6,918,106 B1
(45) Date of Patent: Jul. 12, 2005

(54) METHOD AND APPARATUS FOR COLLOCATING DYNAMICALLY LOADED PROGRAM FILES

(75) Inventors: Richard N. Burridge, Redwood City, CA (US); Jeffrey P. Kesselman, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 422 days.

(21) Appl. No.: 09/629,080

(22) Filed: Jul. 31, 2000

(51) Int. Cl.[7] .............................................. G06F 9/44
(52) U.S. Cl. .................... 717/100; 717/163; 717/165
(58) Field of Search ............................ 717/100, 114, 717/131, 132, 162–166, 127

(56) References Cited

U.S. PATENT DOCUMENTS

| | | | | |
|---|---|---|---|---|
| 5,193,180 A | * | 3/1993 | Hastings ..................... | 717/163 |
| 5,644,764 A | | 7/1997 | Johnson et al. ............. | 395/614 |
| 5,758,348 A | | 5/1998 | Neubauer .................... | 707/103 |
| 5,815,718 A | * | 9/1998 | Tock ........................... | 717/166 |
| 5,835,911 A | | 11/1998 | Nakagawa et al. ......... | 707/203 |
| 5,925,140 A | | 7/1999 | Hudson | |
| 5,953,534 A | * | 9/1999 | Romer et al. ............... | 717/138 |
| 6,178,504 B1 | | 1/2001 | Fieres et al. | |
| 6,202,070 B1 | | 3/2001 | Nguyen et al. | |
| 6,205,579 B1 | | 3/2001 | Southgate | |
| 6,289,506 B1 | * | 9/2001 | Kwong et al. .............. | 717/148 |
| 6,347,398 B1 | | 2/2002 | Parthasarathy et al. | |
| 6,349,344 B1 | * | 2/2002 | Sauntry et al. ............. | 709/332 |
| 6,360,334 B1 | | 3/2002 | Kavanagh et al. | |
| 6,389,467 B1 | | 5/2002 | Eyal | |
| 6,397,378 B1 | * | 5/2002 | Grey et al. .................. | 717/175 |
| 6,405,309 B1 | | 6/2002 | Cheng et al. | |
| 6,463,581 B1 | * | 10/2002 | Bacon et al. ............... | 717/154 |
| 6,470,494 B1 | * | 10/2002 | Chan et al. ................. | 717/166 |
| 6,502,109 B1 | * | 12/2002 | Aravamudan et al. ...... | 707/206 |
| 6,536,035 B1 | * | 3/2003 | Hawkins ..................... | 717/100 |
| 6,658,421 B1 | * | 12/2003 | Seshadri ..................... | 707/100 |
| 6,668,289 B2 | | 12/2003 | Cheng et al. | |
| 6,718,535 B1 | * | 4/2004 | Underwood ................ | 717/101 |
| 6,748,591 B1 | * | 6/2004 | Lewallen .................... | 717/170 |
| 2002/0199170 A1 | * | 12/2002 | Jameson .................... | 717/120 |

OTHER PUBLICATIONS

Krintz et al., Reducing transfer delay using Java class file spliting and prefetching, ACM OOPSLA, pp. 276–291, 1999.*
Newsome et al, "Proxy compilation of dynamically loaded Java classes with MoJo", ACM, LCTES, pp. 204–212, Jun. 2000.*
Liang et al, "Dynamic class loading in the Java Virtual Machine", ACM OOPLSA, pp. 36–44, 1998.*
"JDK 1.2 Roadmap: All Things New with JDK" by Monica Pawlan, Mar. 1998.*
"Special Edition Using Java 2 Platform" by Joseph L. Weber, 1998.*

* cited by examiner

Primary Examiner—Anil Khatri
(74) Attorney, Agent, or Firm—Gunnison, McKay & Hodgson, L.L.P.

(57) ABSTRACT

A method for executing a dynamically loaded program having a main program unit includes executing the main unit a first time, creating at least one library file containing only application program files loaded during the first execution, specifying a system program file input and executing the main program unit a second time using the system program file input and the at least one library file for dynamically loaded program files. A method for optimizing a dynamically loaded program, the program including a main program unit includes creating at least one library file containing only application program files loaded during execution of the main program unit and optimizing the program based upon a list of application program files in the library file. A method for testing a dynamically loaded program, the program including a main program unit includes specifying a list including at least one application program file to be tested, creating at least one library file containing only application program files loaded during execution of the main program unit and indicating incomplete test coverage when at least one file in the list is not represented in the library file.

23 Claims, 24 Drawing Sheets

METHOD AND APPARATUS FOR COLLOCATING DYNAMICALLY LOADED PROGRAM FILES

BACKGROUND OF THE INVENTION

1. Field of the Invention

The present invention relates to object-oriented computer systems having classes that are dynamically loaded at runtime. More particularly, the present invention relates to a method and apparatus for collocating dynamically loaded program files.

2. Background

Programming languages may be classified according to the time at which program units required for program execution are loaded. Dynamic languages allow program units to be loaded dynamically as they are needed. Static languages require that all program units required for program execution be loaded prior to program execution. The "late binding" provided by dynamic languages means that programs only grow as large as they need to be at runtime. Additionally, dynamic languages also enhance program modularity because dynamic languages make fewer compiled-in assumptions about the implementation of data structures than static, early-binding languages like C or C++.

FIG. 1 is a block diagram that illustrates dynamically loaded program files. A loader 10 first loads the main program unit. Program execution proceeds until a program unit that has not already been loaded is referenced. At this point, the loader 10 loads the referenced program unit contained in a file. The loader 10 loads the files on an as needed basis. Dynamically loading program files is described in more detail with reference to FIG. 1A.

Turning now to FIG. 1A, a flow diagram that illustrates dynamically loading program files is presented. At reference numeral 400, a runtime loader is invoked to execute the main program unit. When the runtime loader encounters a reference to a program unit that has not already been loaded (405), the runtime loader searches known input sources until either the program unit is found, or until all input sources have been exhausted (410). The runtime loader loads the program unit (420) if it is found (415).

The dynamic language program files loaded may be categorized many ways. The files loaded are frequently categorized as either system files 12 or application files 14. The term "system files" 12 typically refers to files containing program units supplied as part of a particular execution environment. Conversely, the term "application files" 14 typically refers to files containing program units not supplied as part of a particular execution environment. The system files 12 and application files 14 may be individual program files that are loaded and executed directly. The system files 12 and application files 14 may also be libraries containing one or more individual program files that are first extracted from a library and then loaded.

The Java™ language is one example of a dynamic language. In Java™ technology, a class loader loads classes dynamically one at a time, as they are needed. Any Java™ class can be loaded into a running Java™ interpreter at any time, possibly even over the network. When the Java™ application or applet is loaded in this manner, however, each of the files is transferred in uncompressed form using a separate request, making the process relatively inefficient.

Each Java™ execution environment includes a collection of services and libraries referred to as the Java™ Development Kit (JDK). New applications are created by adding services and libraries that build upon the standard JDK. As these new Java™ services and libraries are developed, their functionality is typically provided to developers as a set of packages provided in different JAR (Java™ ARchive) files, which are archives of files used by a Java™ application. A JAR file allows compressed versions of one or more files to be combined into a single JAR file. Each JAR file also includes a "manifest" file that contains meta-information about the files in the archive.

To use a JAR file, the JAR file is specified as the value of the archive attribute of an applet or application:

<APPLET archive="sound.jar" code="Soundmap.class" width=288 height=288>

. . .

</APPLET>

The "code" attribute tells the browser which of the class files in the archive contains the main method to be executed. The "archive" attribute specifies where to look for files. The archive attribute may specify a list of JAR files. The Web browser or applet viewer searches these archives for any files the applet requires. If a file is not found in an archive, the browser attempts to load the file from the Web using a new HTTP request.

Java™ applications wishing to use new services and libraries must ensure the appropriate JAR files are available to the application at runtime. This requirement is made difficult by the fact that JAR files may be located in multiple places and on multiple servers. Each JAR file may also contain extra Java™ classes or packages that the Java™ application does not use but which are automatically loaded as a part of application initialization.

Development of an application program typically involves creating multiple program units that reference other program units. Each referenced program unit may in turn reference other program units. In a dynamic language environment, each referenced program unit must be loaded at run time before the referenced unit is used. Loading more program units than necessary decreases execution efficiency. Often, removing the reference to the program unit may prevent loading a program unit at run time. For example, a user or developer may create a local method to perform a task, rather than invoke an external program unit. Accordingly, a need exists in the prior art for a method and apparatus for determining which program units are loaded during execution of a dynamically loaded program.

Additionally, loading program units that are unneeded and loading uncompressed program units increases startup time and increases the memory footprint of the running application. Accordingly, a further need exists in the prior art for a method and apparatus for collocating only the program units required for executing a dynamic language program.

SUMMARY OF THE INVENTION

A method for executing a dynamically loaded program having a main program unit includes executing the main unit a first time, creating at least one library file containing only application program files loaded during the first execution, specifying a system program file input and executing the main program unit a second time using the system program file input and the at least one library file for dynamically loaded program files. A method for optimizing a dynamically loaded program, the program including a main program unit includes creating at least one library file containing only application program files loaded during execution of the main program unit and optimizing the program based upon a list of application program files in the library file. A method for testing a dynamically loaded program, the program including a main program unit includes specifying a list including at least one application program file to be tested, creating at least one library file containing only application program files loaded during execution of the main program unit and indicating incomplete test coverage when at least one file in the list is not represented in the library file.

DETAILED DESCRIPTION OF SPECIFIC EMBODIMENTS

Figure 1:
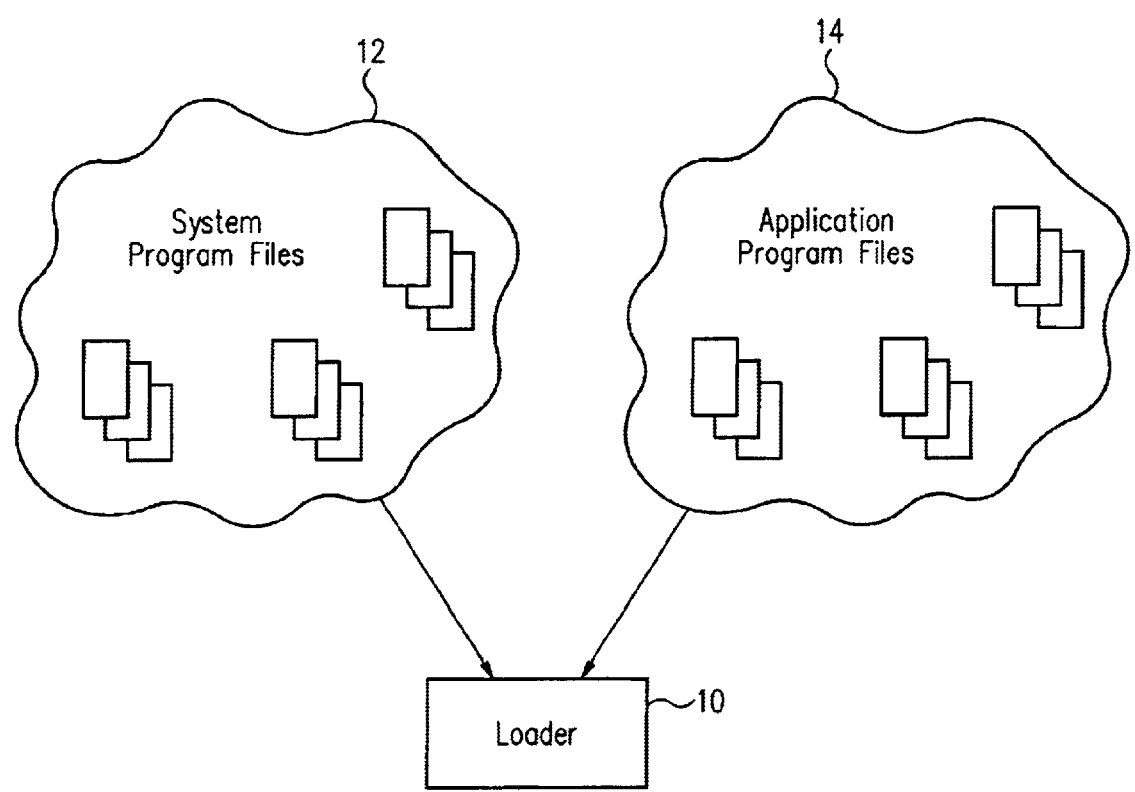
FIG. 1 is a block diagram that illustrates dynamically loaded program files.
Figure 1A:
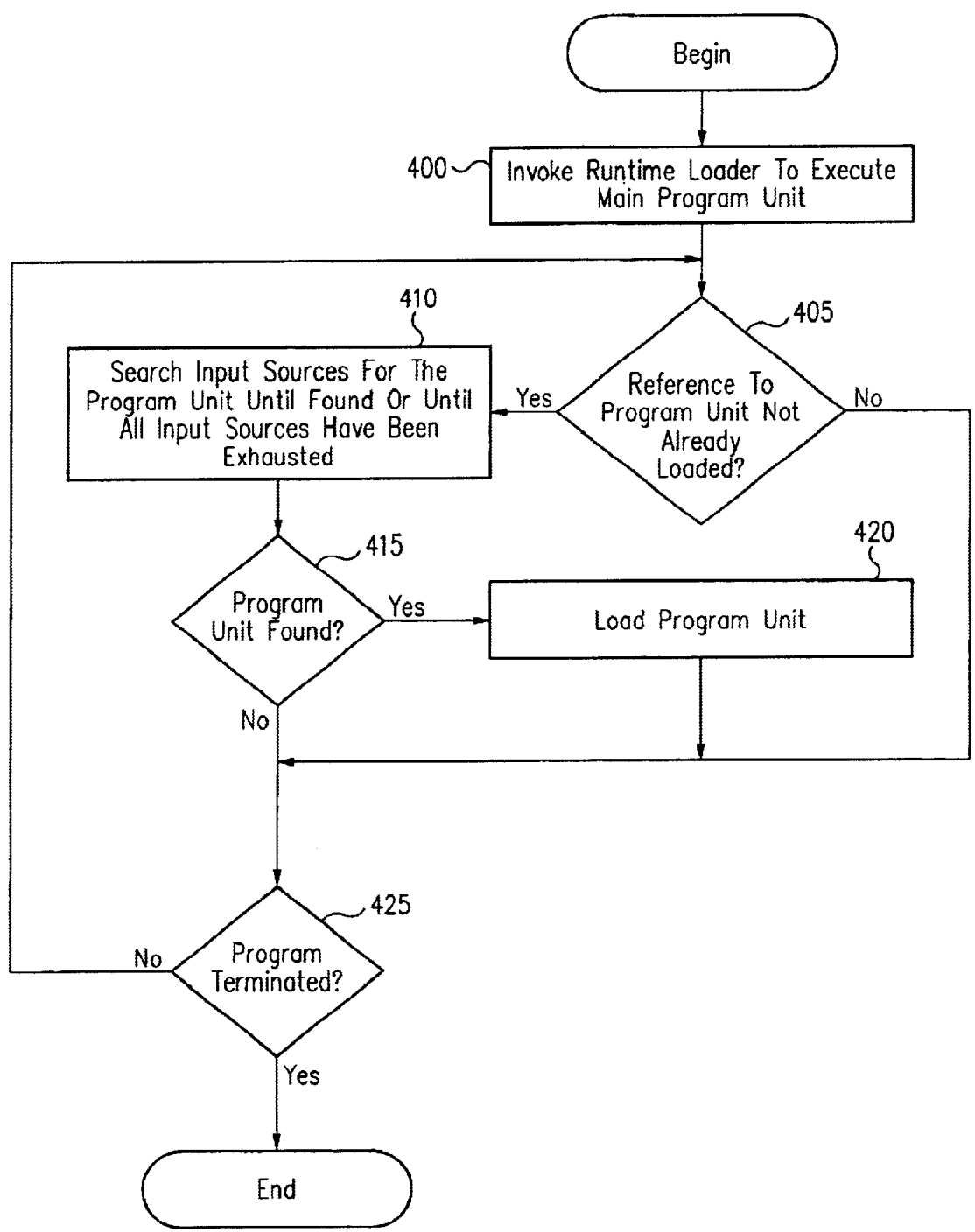
FIG. 1A is a flow diagram that illustrates dynamically loading program files.

Those of ordinary skill in the art will realize that the following description of the present invention is illustrative only. Other embodiments of the invention will readily suggest themselves to such skilled persons having the benefit of this disclosure.

This invention relates to object-oriented computer systems. More particularly, the present invention relates to a method and apparatus for collocating dynamically loaded program files. The invention further relates to machine readable media on which are stored (1) the layout parameters of the present invention and/or (2) program instructions for using the present invention in performing operations on a computer. Such media includes by way of example magnetic tape, magnetic disks, optically readable media such as CD ROMs and semiconductor memory such as PCMCIA cards. The medium may also take the form of a portable item such as a small disk, diskette or cassette. The medium may also take the form of a larger or immobile item such as a hard disk drive or a computer RAM.

According to one embodiment of the present invention, application program files required for execution of a dynamically loaded program are collocated in a library file. Subsequent invocations of the dynamically loaded program retrieve application program files from the library file. The present invention allows increased execution efficiency and decreases application program size by collocating only the application program files required during execution of the program.

Although the program execution environment described herein is described with reference to Java™ technology, the invention has a broader scope. The invention could include any program execution environment featuring dynamically loaded program files. The present invention may be applied to executing, optimizing and testing any program in such a program execution environment.

Since this disclosure is described with reference to the Java™ programming language, this description will utilize the nomenclature of Java™. The following Java™ nomenclature is used frequently throughout the description and will be described herein briefly. A class is a grouping of instance variables and methods that is used to describe the behavior of an object. An object is an instance of a class.

A method is a program segment that performs a well-defined series of operations. In Java™ technology, a method is implemented by instructions represented as a stream of bytecodes. A bytecode is an 8-bit code that can be a portion of an instruction such as an 8-bit operand or opcode. An interface is an abstract class where the bytecodes that implement the method are defined at runtime. A Java™ application is an executable module consisting of bytecodes that can be executed using the Java™ interpreter or the Java™ just-in-time compiler. A more detailed description of the features of the Java™ programming language is provided in James Gosling, Bill Joy and Guy Steele, *The Java™ Language Specification*, Addison Wesley (1996).

Figure 2A:
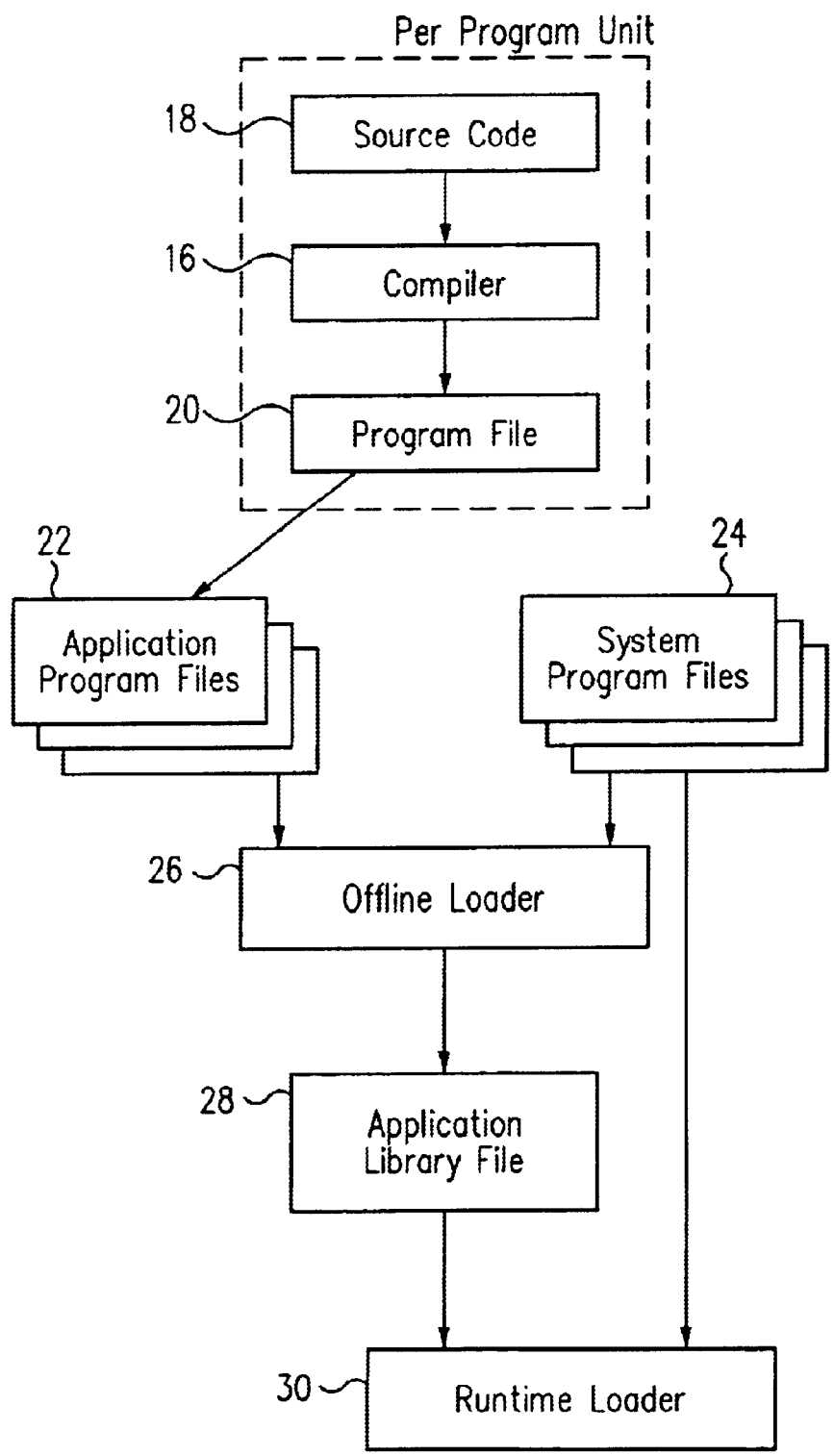
FIG. 2A is a block diagram that illustrates one embodiment of the present invention.

Turning now to FIG. 2A, a block diagram that illustrates one embodiment of the present invention is presented. FIG. 2A is an overview illustrating the sequence of steps used to produce a library file containing application program files. A compiler 16 compiles source code 18 to create program files 20. A user or developer determines which main method will be optimized, and specifies the pathnames for application program files 22 and system program files 24.

The goal of the offline loader 26 is to determine which program units are application program units and write them to a library file. The offline loader 26 loads the main method and begins to execute it. If the offline loader 26 requires a program unit that has not already been loaded, the offline loader 26 obtains the program unit from the pathnames specified. If the loaded program unit is an application program unit, the offline loader 26 writes a copy of the program file to an application library file 28 and continues executing the main method. When the main method has terminated, the application library file 28 contains all application program files 22 loaded during the execution of the main method.

Throughout this disclosure, the term "pre-run" is used to denote the process described above, wherein an offline loader executes the main method and creates a library file containing all application files loading during execution of the main method.

As mentioned above, application library file 28 contains all application program files 22 loaded during the execution of the main method. If all possible execution paths were exercised at reference numeral 26, the application library file 28 will contain all the application program files that will be referenced during subsequent executions of the main method. Therefore, according to this embodiment of the present invention, subsequent invocations of the main method specify the application library file 28 as the input source for application program files. Runtime loader 30 is used to load and execute the main method during subsequent executions of the main method.

It should be noted that the method and system described herein pertains to creating a library file containing only application program files. However, the method and system described herein is not limited to these particular types of program files. Any program file grouping could be used using the method and system described herein.

Figure 2B:
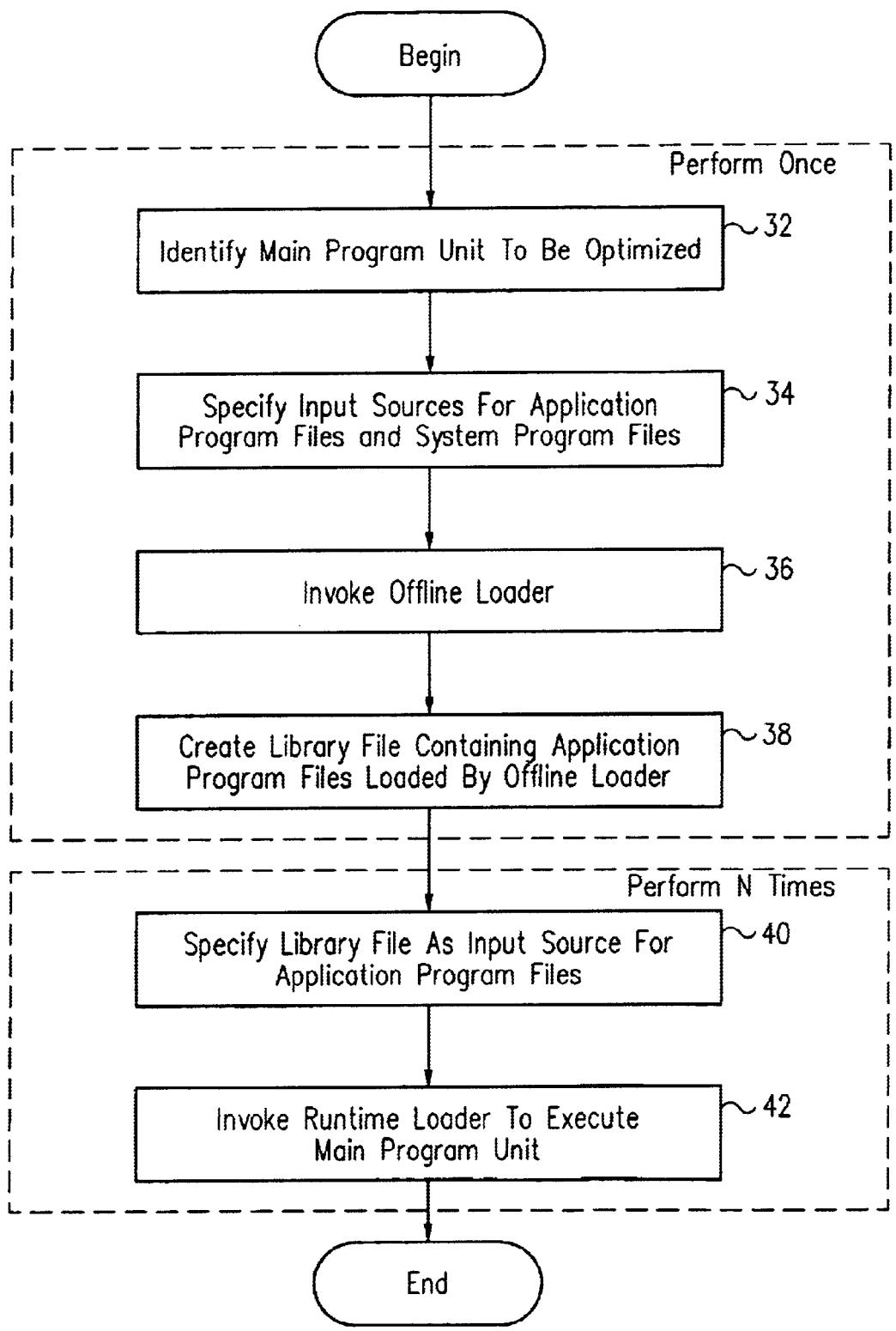
FIG. 2B is a high level flow diagram that illustrates creating and using an optimized library file in accordance with one embodiment of the present invention.

Turning now to FIG. 2B, a high level flow diagram that illustrates creating and using an optimized library file in accordance with one embodiment of the present invention is presented. A user or developer first identifies the main program unit to be optimized (32). The user then specifies the pathname(s) for application files and system program files (34) and invokes an offline loader (36). The offline loader is configured to load program units required by the loader during a first execution of the main program unit. The offline loader is further configured to create a library file, and write to the library file all program units loaded during the first execution of the main program unit (38). Preferably, every execution path is executed during the first execution.

The library file created at reference numeral 38 is used as the input source for application program files in subsequent executions of the main program unit. For each subsequent execution of the main program unit, the library file is specified as the input source for application files (40) and a runtime loader is invoked to execute the main program unit (42). When the runtime loader requires an application program unit not already loaded, the runtime loader obtains the unit from the library file, thus significantly reducing the amount of overhead involved in obtaining application program files from multiple sources. The runtime loader actions are described in more detail with reference to FIG. 2C.

Figure 2C:
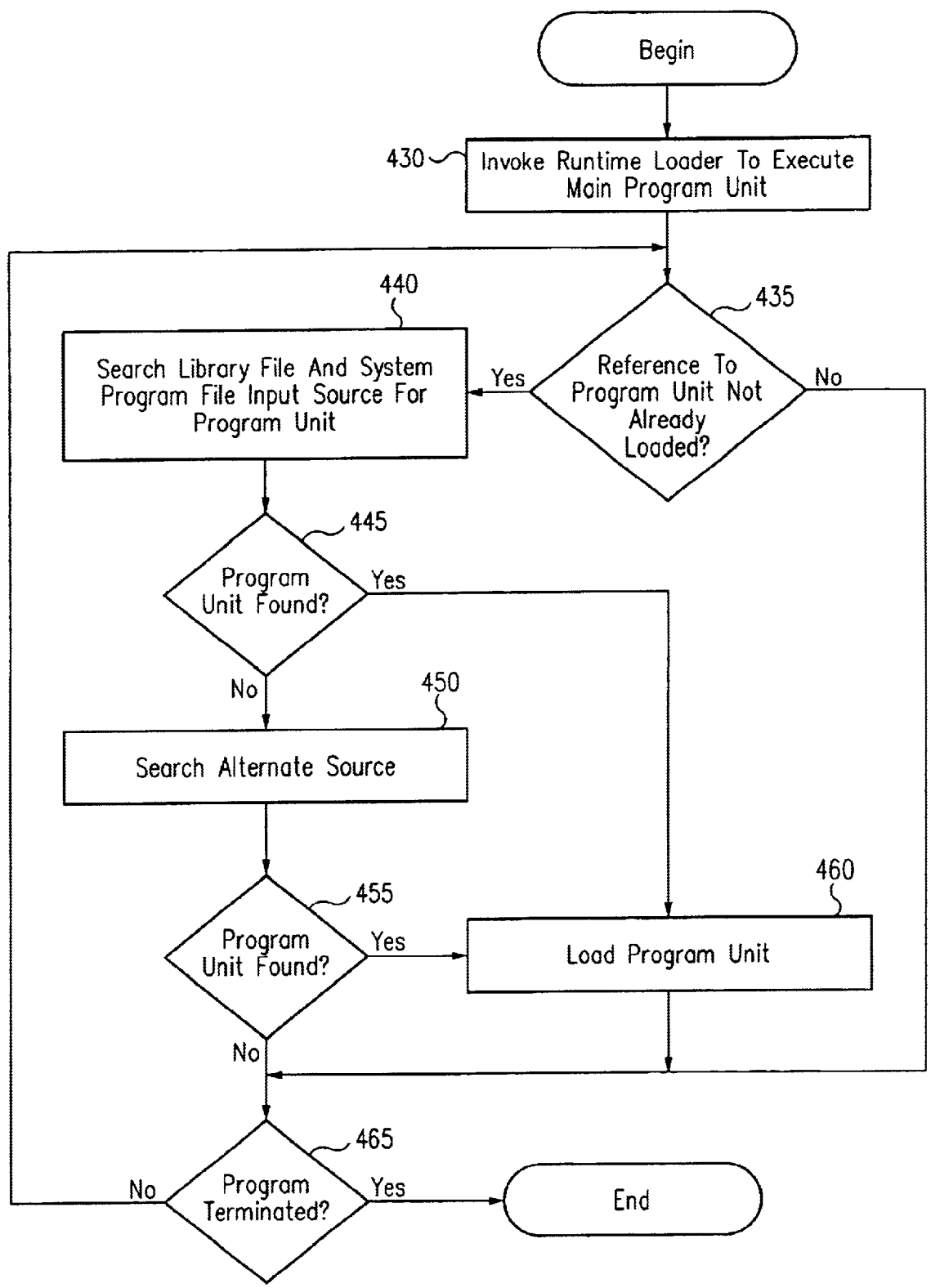
FIG. 2C is a flow diagram that illustrates dynamically loading program files in accordance with one embodiment of the present invention.

Turning now to FIG. 2C, a flow diagram that illustrates dynamically loading program files in accordance with one embodiment of the present invention is presented. At reference numeral 430, a runtime loader is invoked to execute the main program unit. When the runtime loader encounters a reference to a program unit that has not already been loaded (435), the runtime loader first searches for the program unit. The runtime loader looks first in the previously created library file and a system program file input source (440). Since the library file contains application program files that were loaded during a prior execution of the same main program unit, all application program units referenced during subsequent invocations of the main program unit should be found in the library file. However, if the program unit has not been found after the initial search at reference numeral 440, the runtime loader optionally searches an alternate source for the program unit. The runtime loader loads the program unit (460) if it is found (455).

Figure 3A:
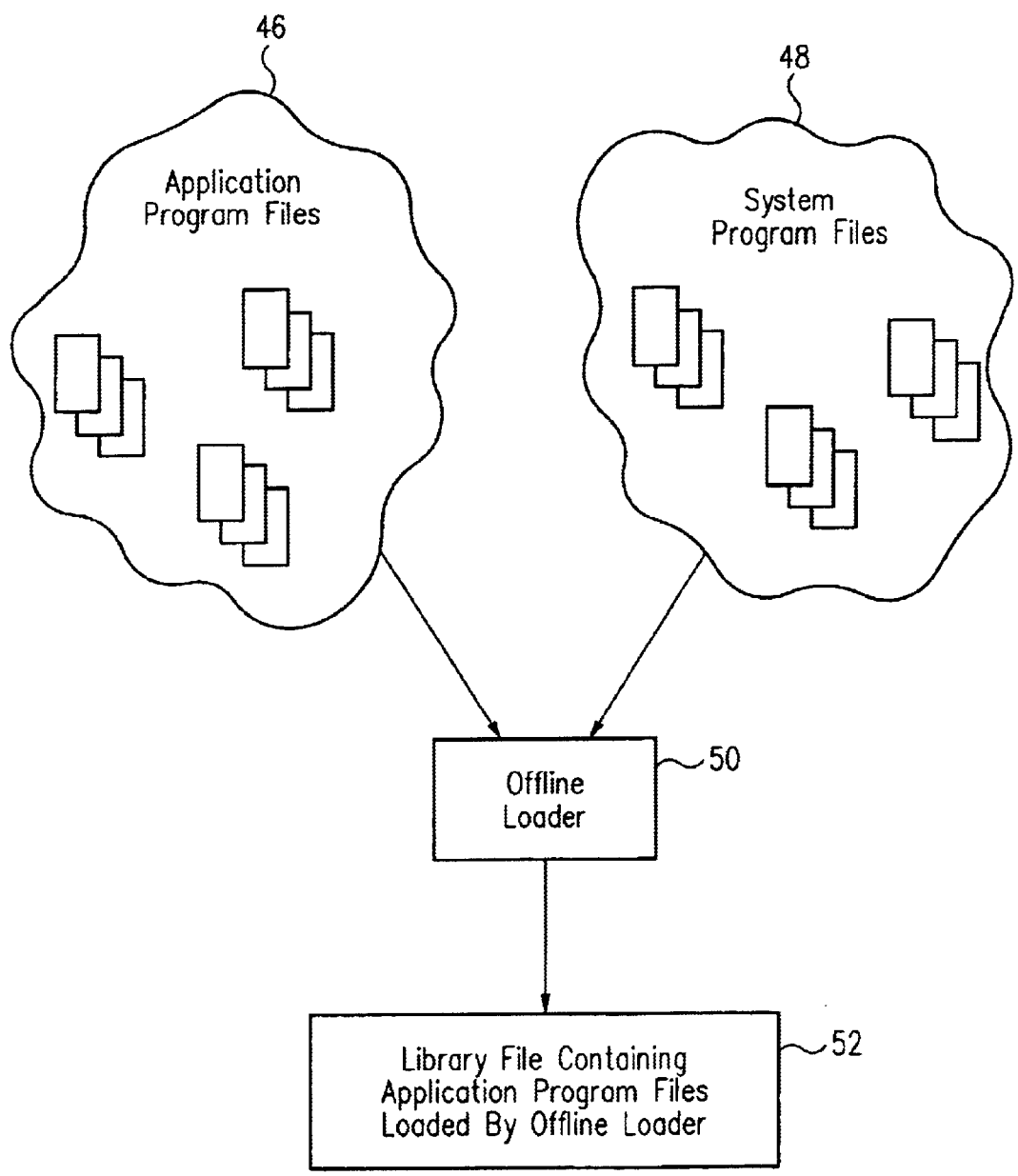
FIG. 3A is a block diagram that illustrates creating an optimized library file containing application program files in accordance with one embodiment of the present invention.

Turning now to FIG. 3A, a block diagram that illustrates creating an optimized library file containing application program files in accordance with one embodiment of the present invention is presented. During program execution, application program files 46 and system program files 48 are loaded as needed by an offline loader 50. The offline loader 50 checks each program file loaded to determine whether the program file is an application program file 46 or a system program file 48. Application program files 46 are stored to a library file 52.

The description of program files as either application program files 46 or system program files 48 is not intended to be limiting in any way. Those of ordinary skill in the art will recognize that the invention may be applied to other program file groupings.

Figure 3B:
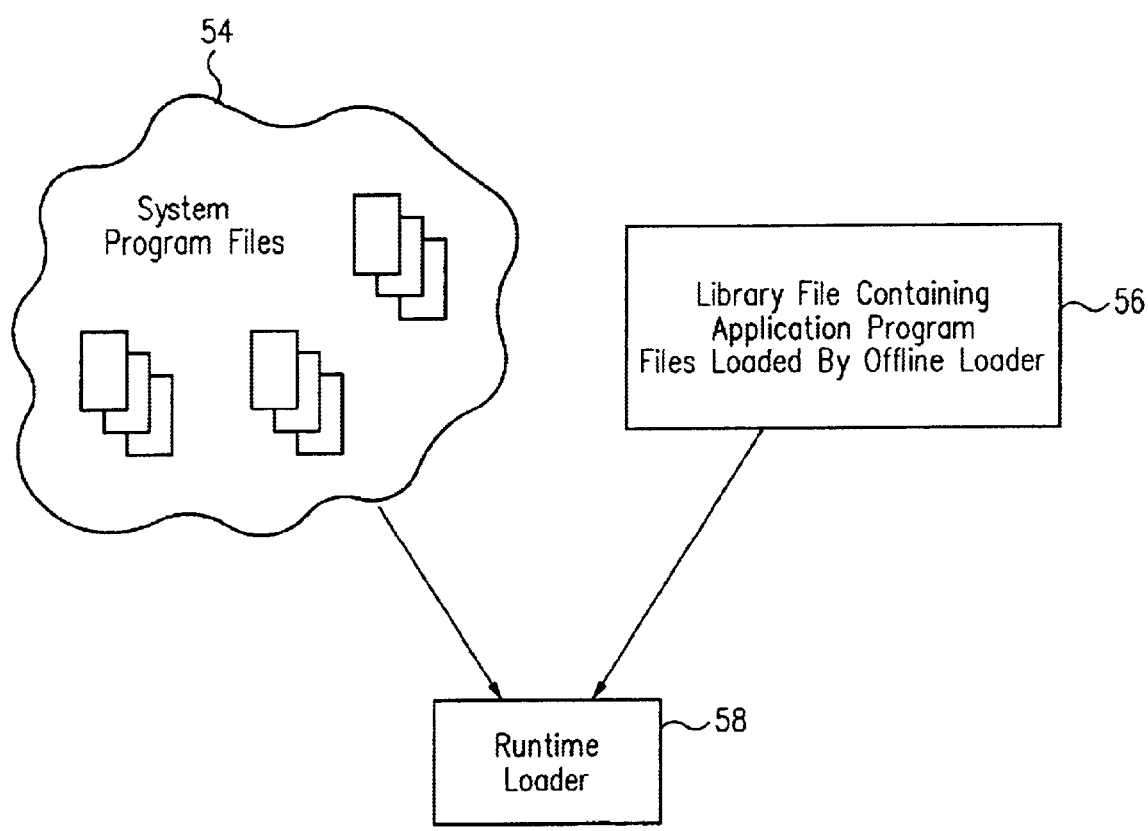
FIG. 3B is a block diagram that illustrates executing a dynamically loaded program in accordance with one embodiment of the present invention.

Turning now to FIG. 3B, a block diagram that illustrates executing a dynamically loaded program in accordance with one embodiment of the present invention is presented. The library file 52 created as illustrated in FIG. 2 serves as the input source for application program files. During program execution, system program files 54 and application program files from at least one library file 56 are loaded as needed by a run time loader 58.

Figure 4:
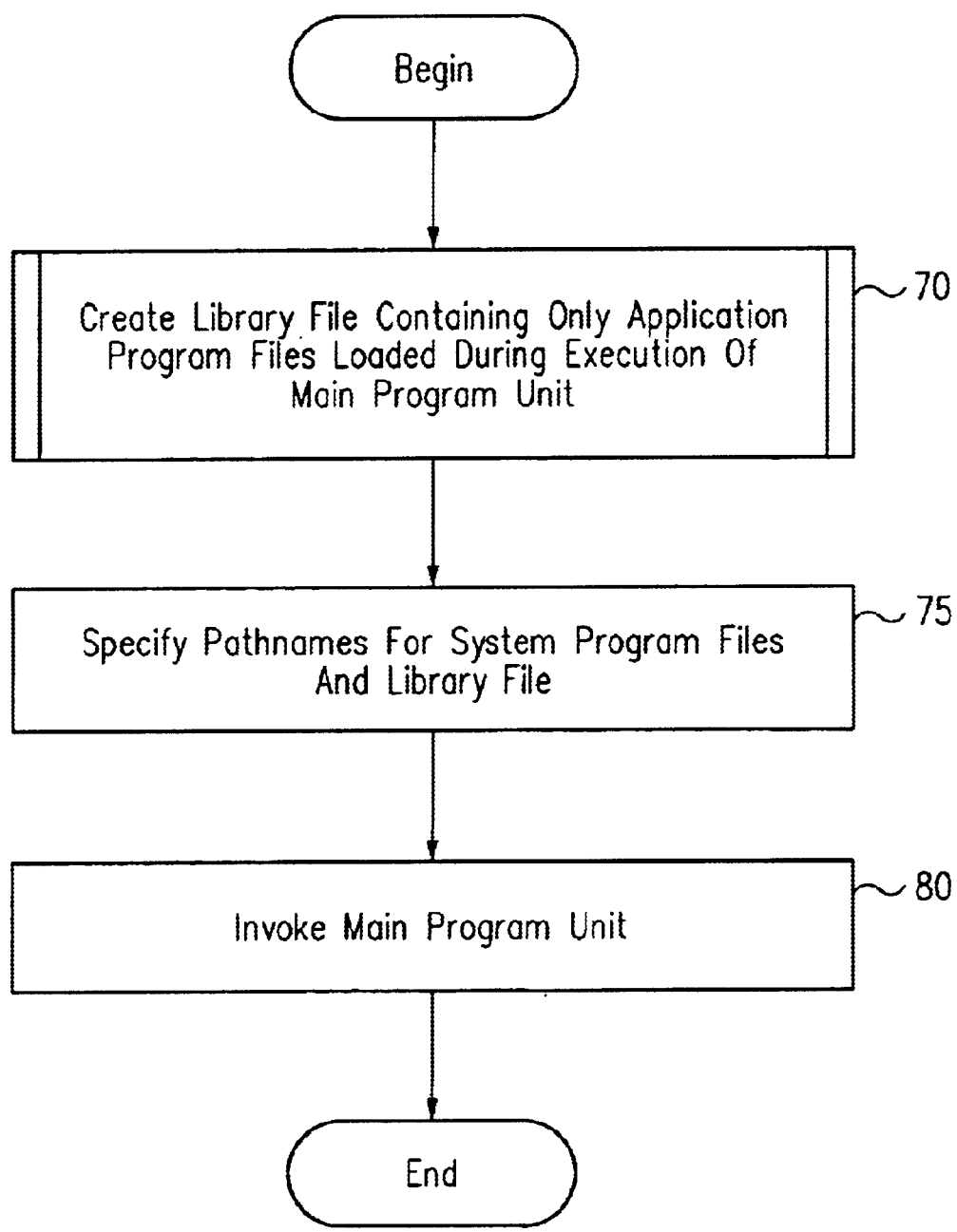
FIG. 4 is a flow diagram that illustrates executing a dynamically loaded program in accordance with one embodiment of the present invention.

Turning now to FIG. 4, a flow diagram that illustrates executing a dynamically loaded program in accordance with one embodiment of the present invention is presented. At reference numeral 70, a library file containing only application program files loaded during execution of the main program unit is created. At reference numeral 75, pathnames for system program files and the library file created at reference numeral 70 is specified. At reference numeral 80, the main program unit is invoked using the pathnames specified in reference numeral 75 as input sources for system program files 54 and application program files.

Figure 5:
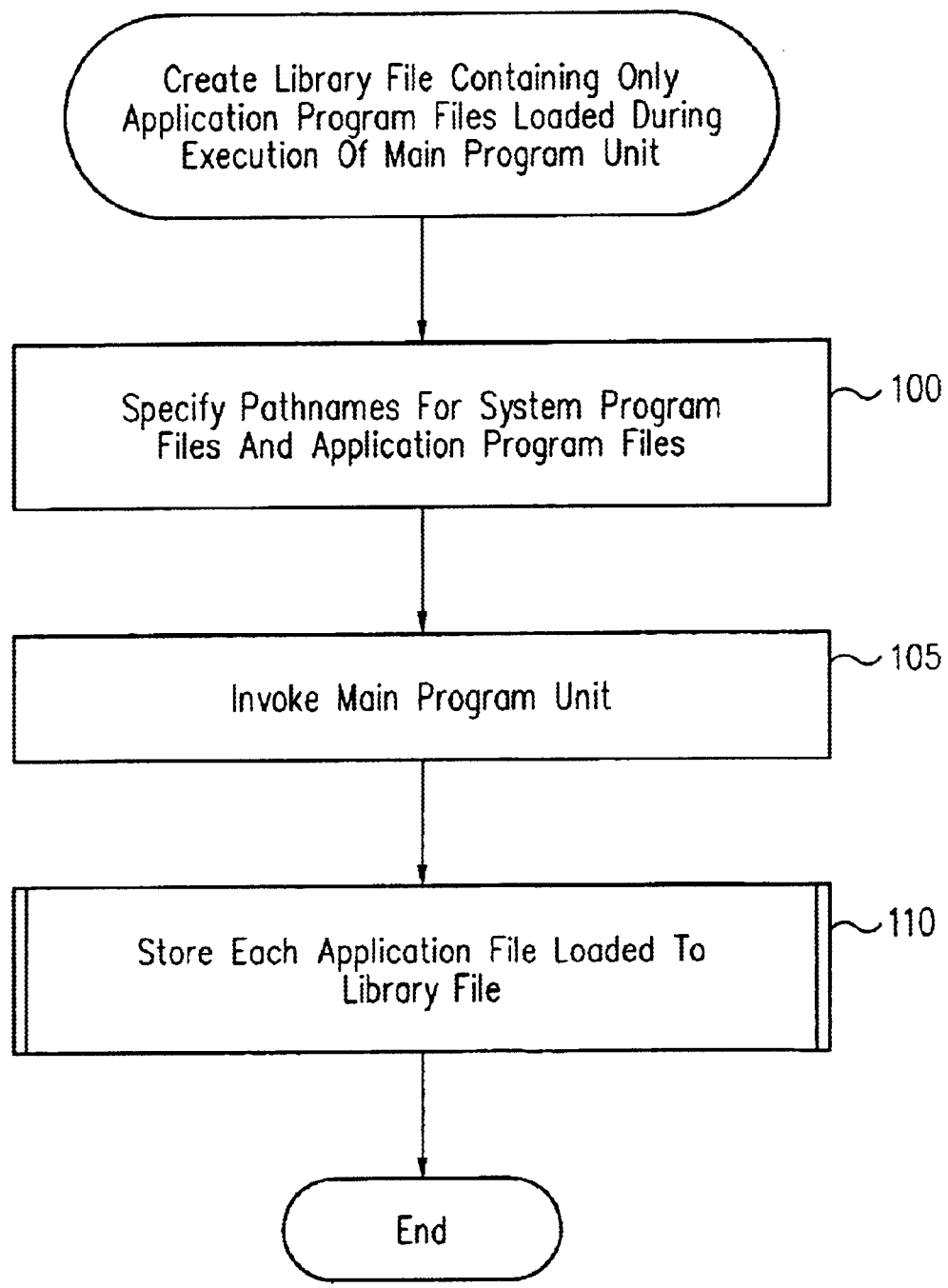
FIG. 5 is a flow diagram that illustrates creating a library file in accordance with one embodiment of the present invention.

Turning now to FIG. 5, a flow diagram that illustrates creating a library file 55 in accordance with one embodiment of the present invention is presented. FIG. 5 provides more detail regarding reference numeral 70 in FIG. 4. At reference numeral 100, pathnames for system program files and application program files are specified. At reference numeral 105, the main program unit is invoked. At reference numeral 110, each application program file loaded during execution of the main program unit is written to a library file.

Figure 6:
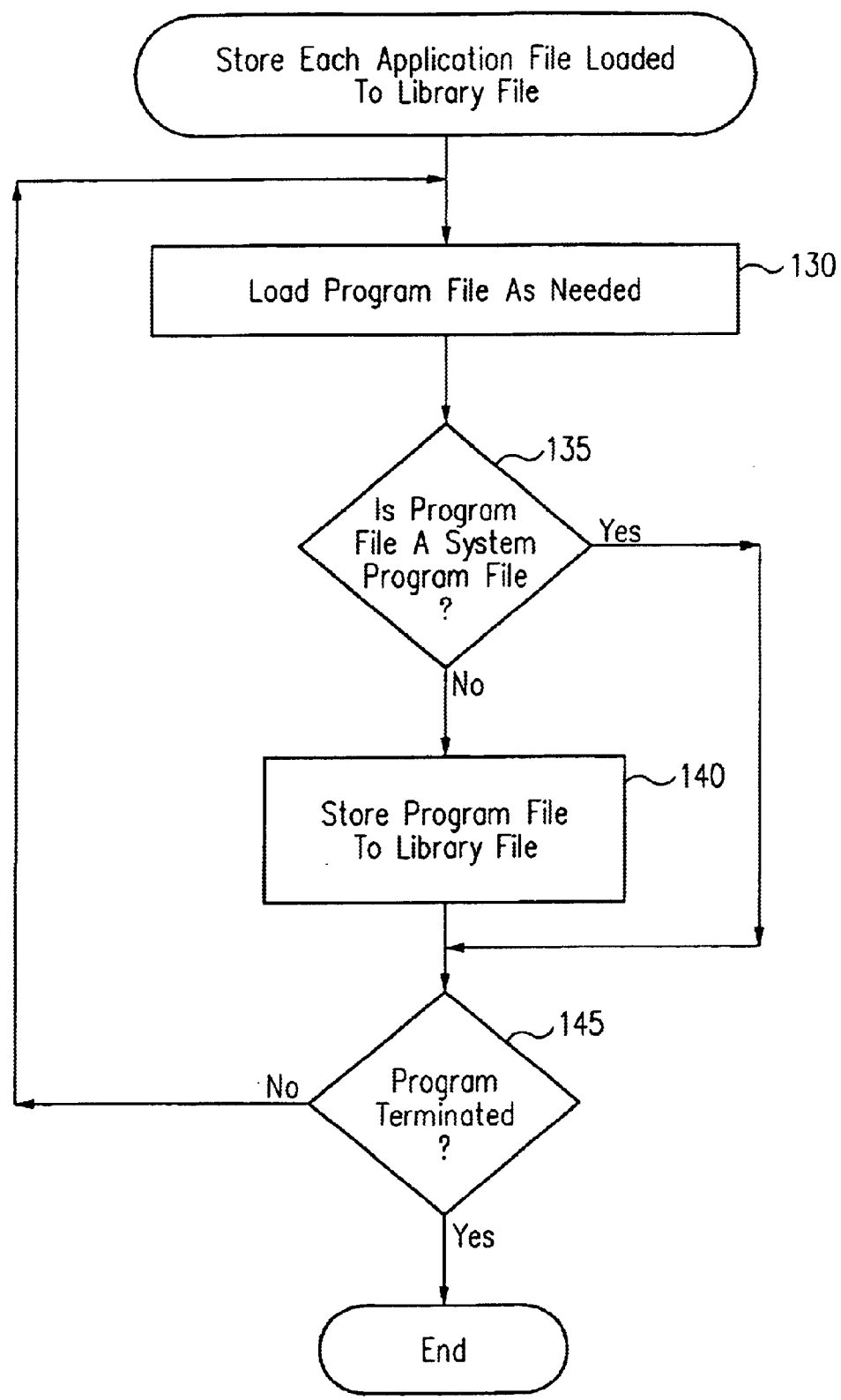
FIG. 6 is a flow diagram that illustrates storing loaded application program files to a library file in accordance with one embodiment of the present invention.

Turning now to FIG. 6, a flow diagram that illustrates storing loaded application program files to a library file in accordance with one embodiment of the present invention is presented. At reference numeral 130, program files are loaded as needed during execution of the main program unit. At reference numeral 135, a determination is made regarding whether a loaded program file is a system program file. If the loaded program file is not a system program file, the file is stored to the library file at reference numeral 140. At reference numeral 145, a determination is made regarding whether execution of the main program unit has terminated. If execution of the main program unit has not been terminated, storing application program files to a library file continues at reference numeral 130.

As mentioned previously, development of an application program typically involves creating multiple program units that reference other program units. Each referenced program unit may in turn reference other program units. In a dynamic language environment, each referenced program unit must be loaded at run time before the referenced unit is used. Loading more program units than necessary decreases execution efficiency. Often, removing the reference to the program unit may prevent loading a program unit at run time. For example, a user or developer may create a local method to perform a task, rather than invoke an external program unit.

According to one embodiment of the present invention, a list of application program files loaded during execution of a dynamically loaded program is used to optimize the application program. Application program files that are not expected to be required may initiate further investigation to determine whether the program files are required. If the unexpected application program files are not required, modifications may be made to other application program files to remove the reference to the unexpected program files, thus decreasing the memory footprint and increasing the execution efficiency of the application program. This embodiment is described further with reference to FIGS. 7A to 8.

Figure 7A:
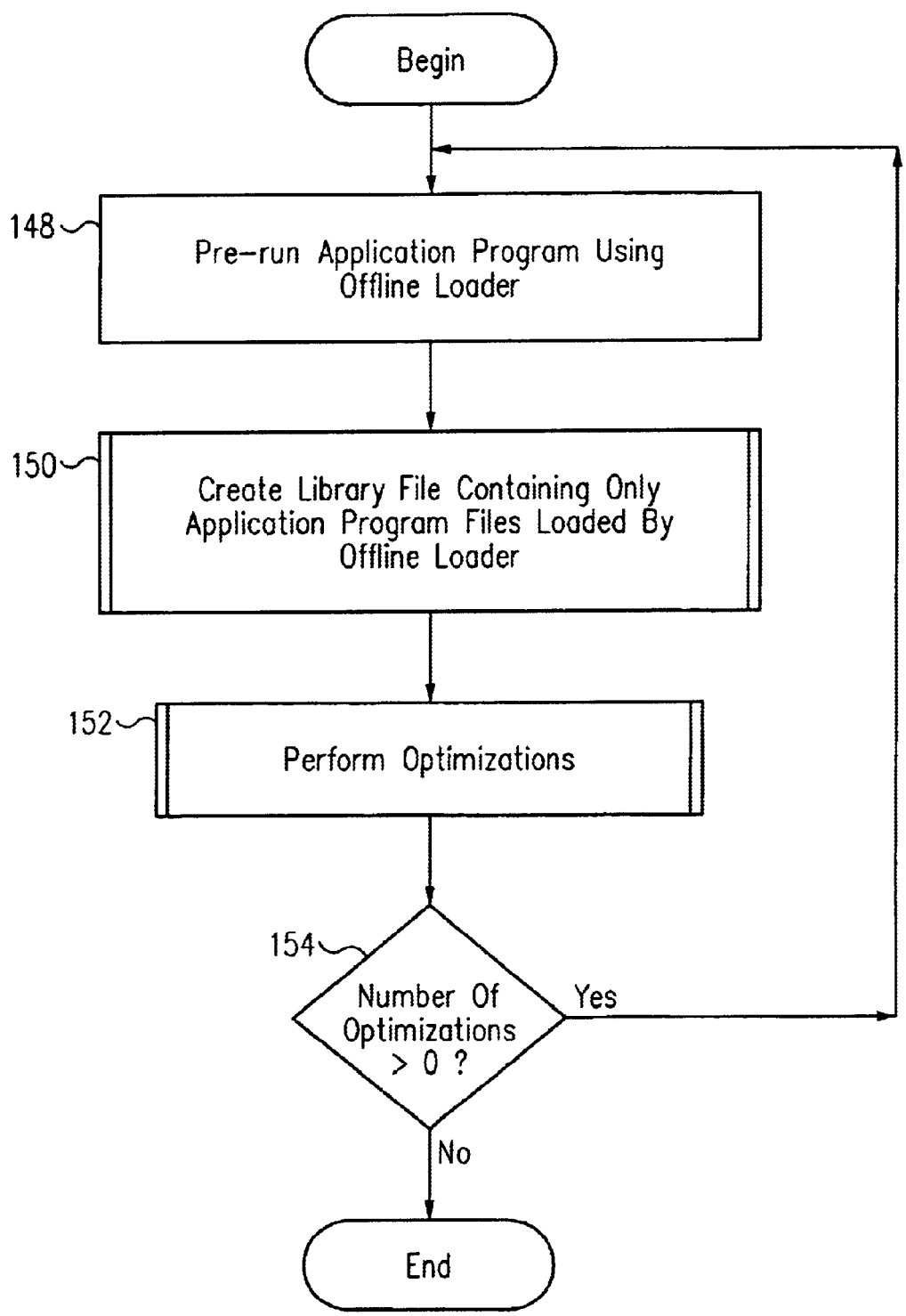
FIG. 7A is a flow diagram that illustrates optimizing a dynamically loaded program in accordance with one embodiment of the present invention.

Turning now to FIG. 7A, a flow diagram that illustrates optimizing a dynamically no loaded program in accordance with one embodiment of the present invention is presented. At reference numeral 148, an application program is pre-run using an offline loader. At reference numeral 150, the offline loader creates a library file containing only application program files loaded by the offline loader. At reference numeral 152, program optimizations are performed based upon whether the list of program units in the library file is expected.

Figure 7B:
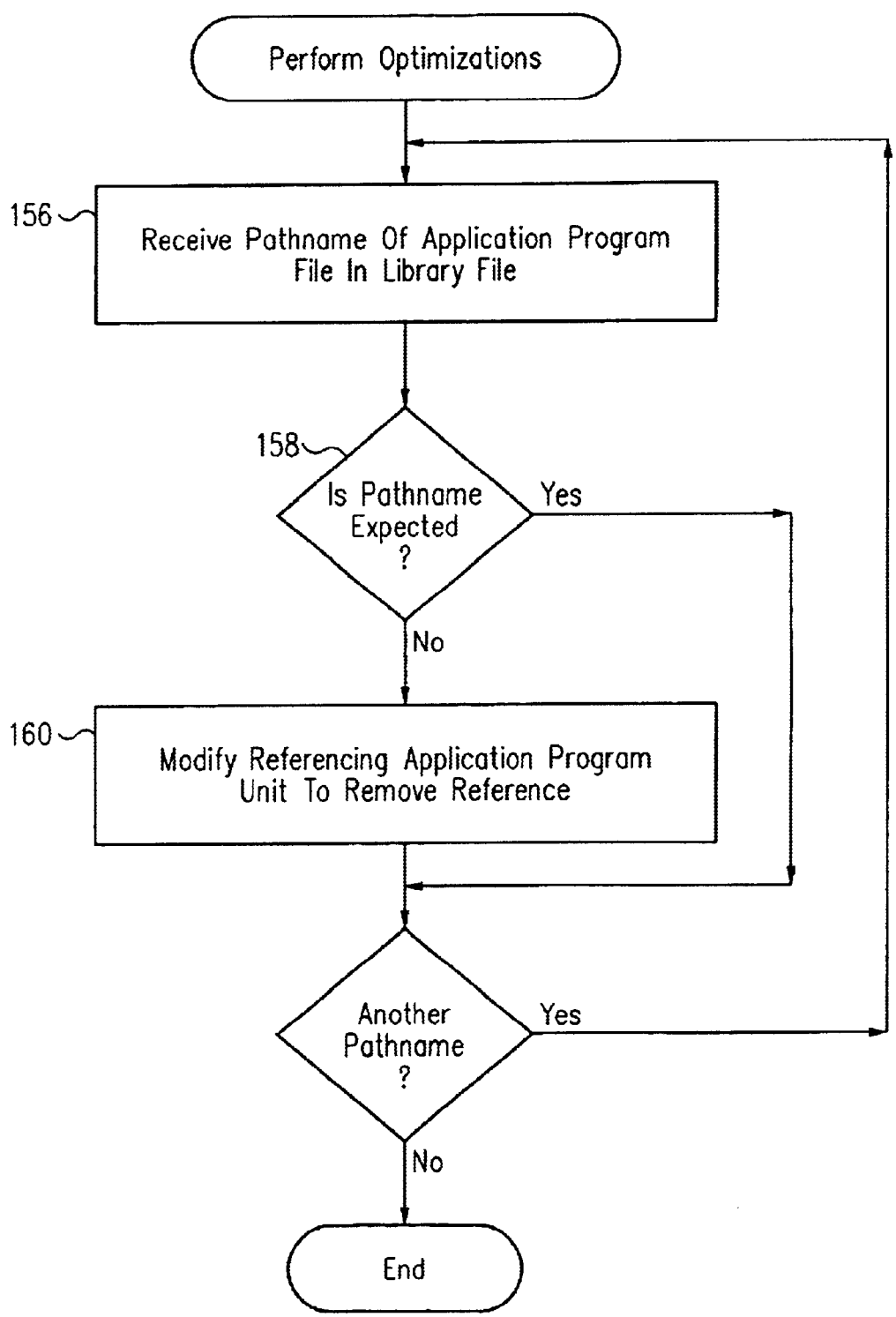
FIG. 7B is a flow diagram that illustrates performing optimizations in accordance with one embodiment of the present invention.

Turning now to FIG. 7B, a flow diagram that illustrates performing optimizations in accordance with one embodiment of the present invention is presented. FIG. 7B corresponds to reference numeral 152 in FIG. 7A. At reference numeral 156, a developer examines the pathname of an application program file included in the library file. If the developer determines pathname is expected (158), the next pathname is examined at reference numeral 156. The presence of an unexpected application program file indicates that during program execution, another program unit (the referencing program unit) referenced the unexpected application program file (the referenced program unit). If the pathname is not expected, the developer removes the reference by first determining the referencing program unit and then modifying referencing program unit to remove the reference (160).

An example of an unexpected pathname is the case where a developer is developing a cohesive set of program units that are supposed to be all located within a certain directory structure. Here, a developer might expect that all application program files loaded during execution of a program under test would have pathnames that shared a common directory path. Noticing an unexpected pathname could initiate further inquiry as to the reason why the program unit was referenced. If it is determined that the reference should be removed, the referencing program unit is modified to remove the reference.

Figure 8:
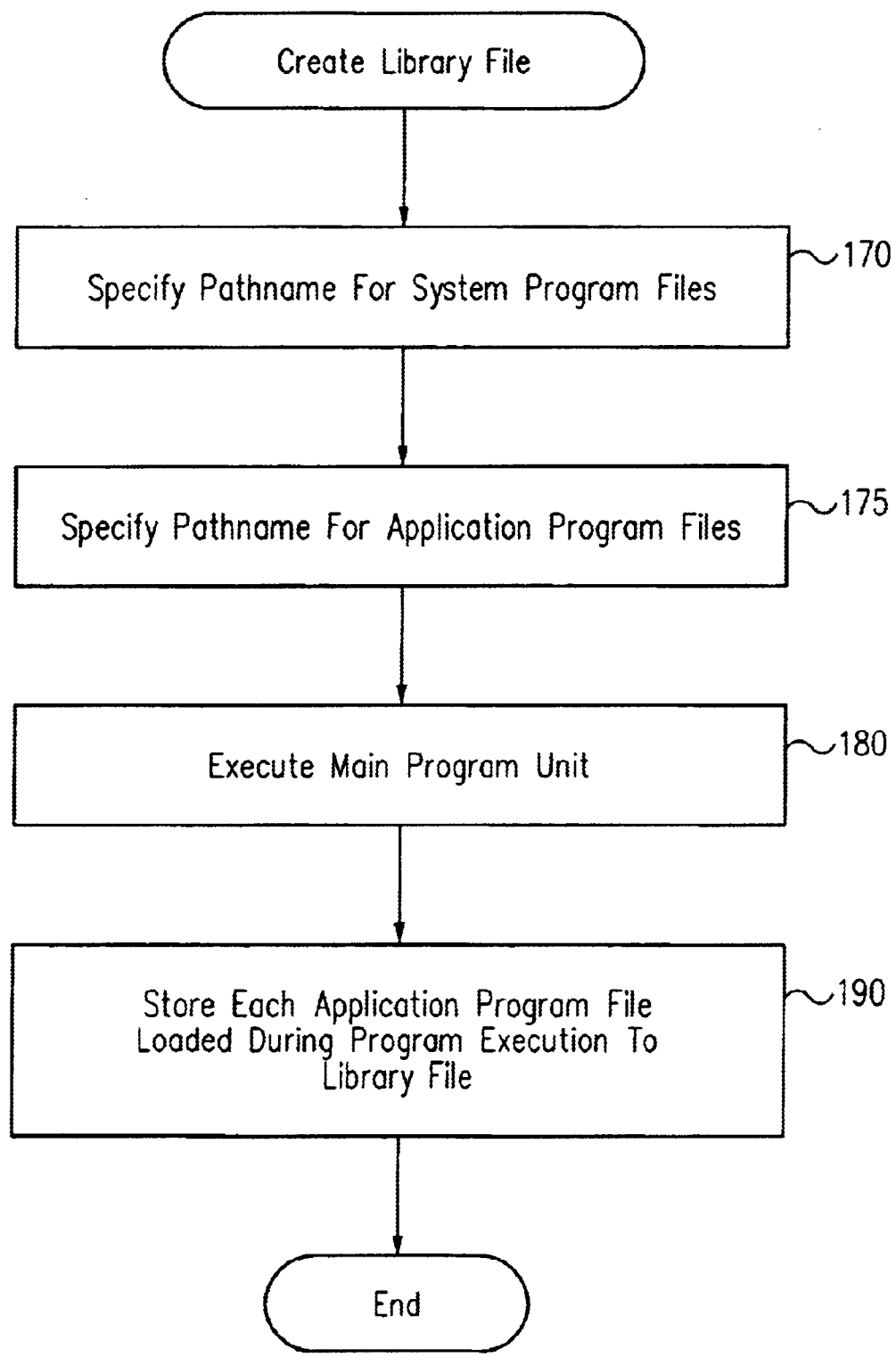
FIG. 8 is a flow diagram that illustrates creating a library file in accordance with one embodiment of the present invention.

Turning now to FIG. 8, a flow diagram that illustrates creating a library file 30 in accordance with one embodiment of the present invention is presented. FIG. 8 provides more detail regarding reference numeral 150 in FIG. 7A. Pathnames for system program files and application program files are specified at reference numerals 170 and 175, respectively. At reference numeral 180, the main program unit is executed. At reference numeral 190, each application program file 35 loaded during execution of the main program unit is stored to the library file 30.

According to another embodiment of the present invention, two application program file lists are compared to determine whether a test plan includes at least one test for each application program file to be tested. A first list includes the application program files to be tested by a test plan. A second list includes the application program files loaded during execution of the test plan for a dynamically loaded program. The first list and the second list are compared. The absence of an application program file in the second list indicates that the test plan failed to include at least one test for the absent application program file. This embodiment is described further with reference to FIG. 9.

Figure 9:
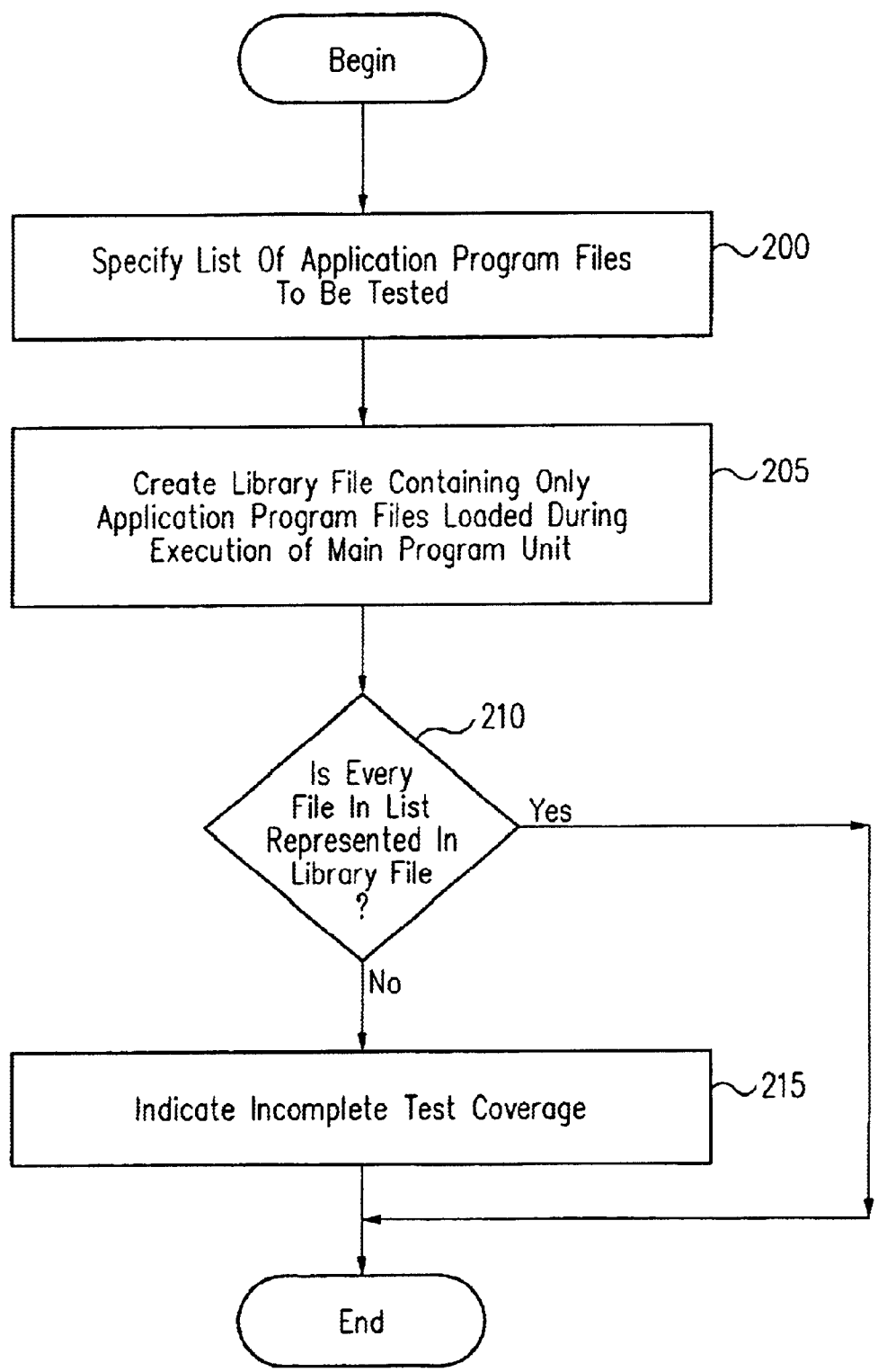
FIG. 9 is a flow diagram that illustrates testing a dynamically loaded program in accordance with one embodiment of the present invention.

Turning now to FIG. 9, a flow diagram that illustrates testing a dynamically loaded program in accordance with one embodiment of the present invention is presented. At reference numeral 200, a list of application program files to be tested is specified. At reference numeral 205, a library file containing only application program files loaded during execution of the main program unit is created. At reference numeral 210, a determination is made regarding whether every file in the list of application program files is represented in the library file. If at least one file is not represented in the list, an indication of incomplete test coverage is made at reference numeral 215. An indication of incomplete test coverage means that the test plan did not result in executing any execution paths within each of the application program files that are represented in the list of application program files to be tested but are not represented in the library file.

According to other embodiments of the present invention, the invention is applied to a Java™ technology environment. According to these embodiments, the application program files are class files, the system program files are part of the Java™ Development Kit (JDK), the loader is a Java™ class loader and the library file is a Java™ ARchive (JAR) file. These embodiments are described further with reference to FIGS. 10A to 15B.

Figure 10A:
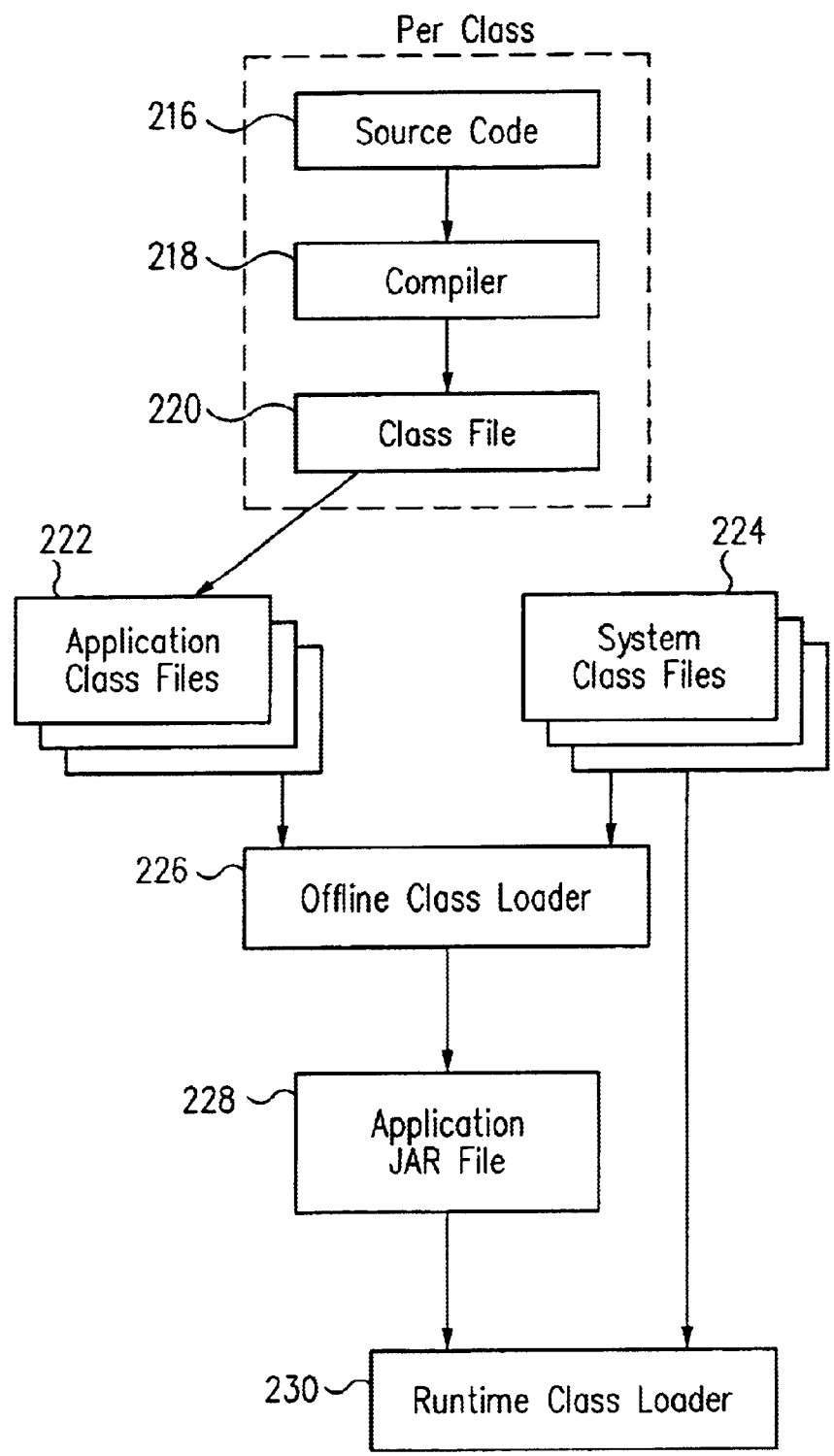
FIG. 10A is a block diagram that illustrates one embodiment of the present invention.

Turning now to FIG. 10A, a block diagram that illustrates one embodiment of the present invention is presented. FIG. 2A is an overview illustrating the sequence of steps used to produce a JAR file containing class files. A compiler 218 compiles source code 216 to create class files 220. A user or developer determines which main method will be optimized, and specifies the pathnames for application class files 222 and system class files 224.

The goal of the offline loader 226 is to determine which class files are application class files and write them to a JAR file 228. The offline class loader 226 loads the main method and begins to execute it. If the offline class loader 226 requires a class file that has not already been loaded, the offline class loader 226 obtains the class file from the pathnames specified. If the loaded class file is an application class file 222, the offline class loader 226 writes a copy of the class file to an application JAR file 228 and continues executing the main method. When the main method has terminated, the application JAR file 228 contains all application class files 222 loaded during the execution of the main method.

As mentioned above, application JAR file 228 contains all application class files 222 loaded during the execution of the main method. If all possible execution paths were exercised at reference numeral 226, the application JAR file 228 will contain all the application class files that will be referenced during subsequent executions of the main method. Therefore, according to this embodiment of the present invention, a subsequent invocations of the main method specify the application JAR file 228 as the input source for application class files. Runtime class loader 300 is used to load and execute the main method during subsequent executions of the main method. At run time, Runtime class loader 300 obtains application class files from the application JAR file 28, thus significantly reducing the amount of overhead involved in obtaining application class files from multiple sources.

Figure 10B:
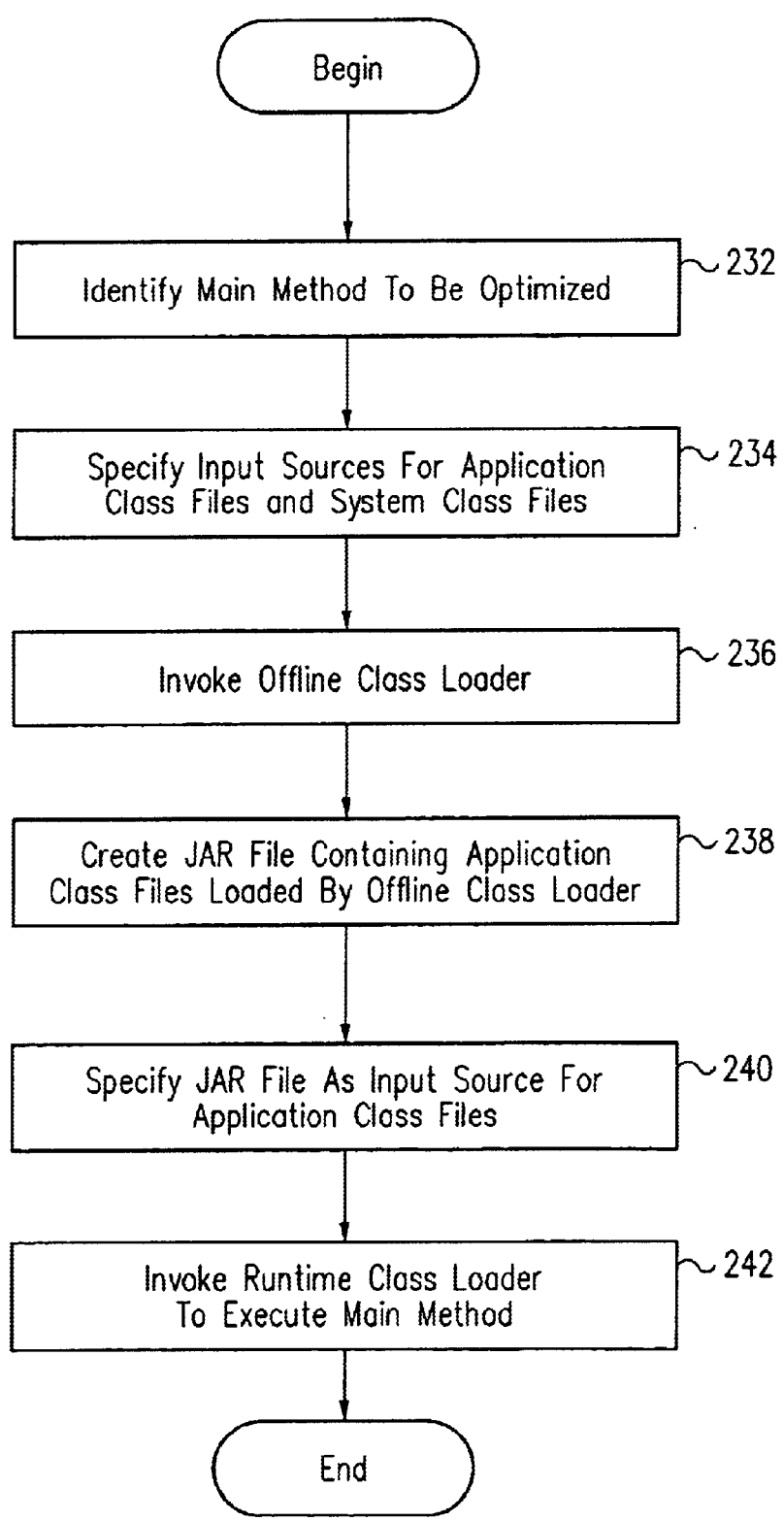
FIG. 10B is a high level flow diagram that illustrates creating and using an optimized JAR file in accordance with one embodiment of the present invention.

Turning now to FIG. 10B, a high level flow diagram that illustrates creating and using an optimized JAR file in accordance with one embodiment of the present invention is presented. A user or developer first identifies the main program unit to be optimized (232). The user then specifies the pathname(s) for application class files and system class files (234) and invokes an offline class loader (236). The offline class loader is configured to load class files required by the class loader during a first execution of the main program unit. The offline class loader is further configured to create a JAR file, and write to the JAR file all class files loaded during the first execution of the main program unit (238).

The JAR file created at reference numeral 238 is used as the input source for application class files in subsequent executions of the main method. For each subsequent execution of the main method, the JAR file is specified as the input source for application class files (240) and a runtime class loader is invoked to execute the main method (242). When the runtime class loader requires an application class file not already loaded, the runtime class loader obtains the class file from the JAR file.

Figure 10C:
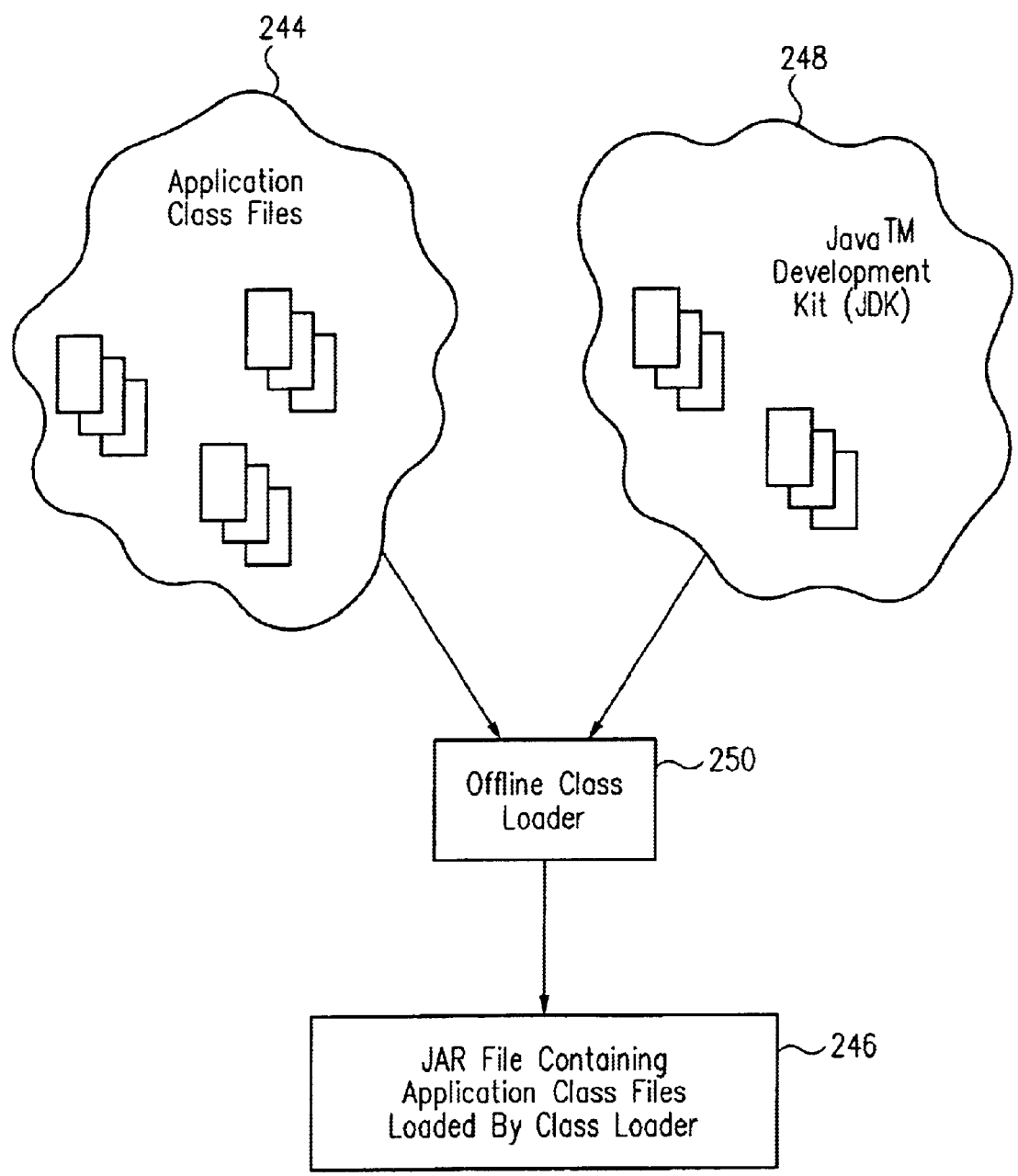
FIG. 10C is a block diagram that illustrates creating a Java™ ARchive (JAR) file containing class files in accordance with one embodiment of the present invention.

Turning now to FIG. 10C, a block diagram that illustrates creating a Java™ ARchive (JAR) file 246 containing class files in accordance with one embodiment of the present invention is presented. During execution of a Java™ application, application class files 244 and system class files 248 are loaded as needed by an offline Java™ class loader 250. The offline class loader 250 checks each class file loaded to determine whether the class file is an application class file or a system class file. Application class files 244 are stored to a JAR file 246.

The description of a JAR file 246 as a repository for application class files 244 loaded by an offline class loader 250 is not intended to be limiting in any way. Those of ordinary skill in the art will recognize that other file formats may be used.

Moreover, the creation of a single library file or JAR file 246 is not intended to be limiting in any way. The method and system described herein is not limited to producing this one file. Other file configurations can be used including, but not limited to, multiple JAR files 246 containing application program units such as class files.

Figure 11A:
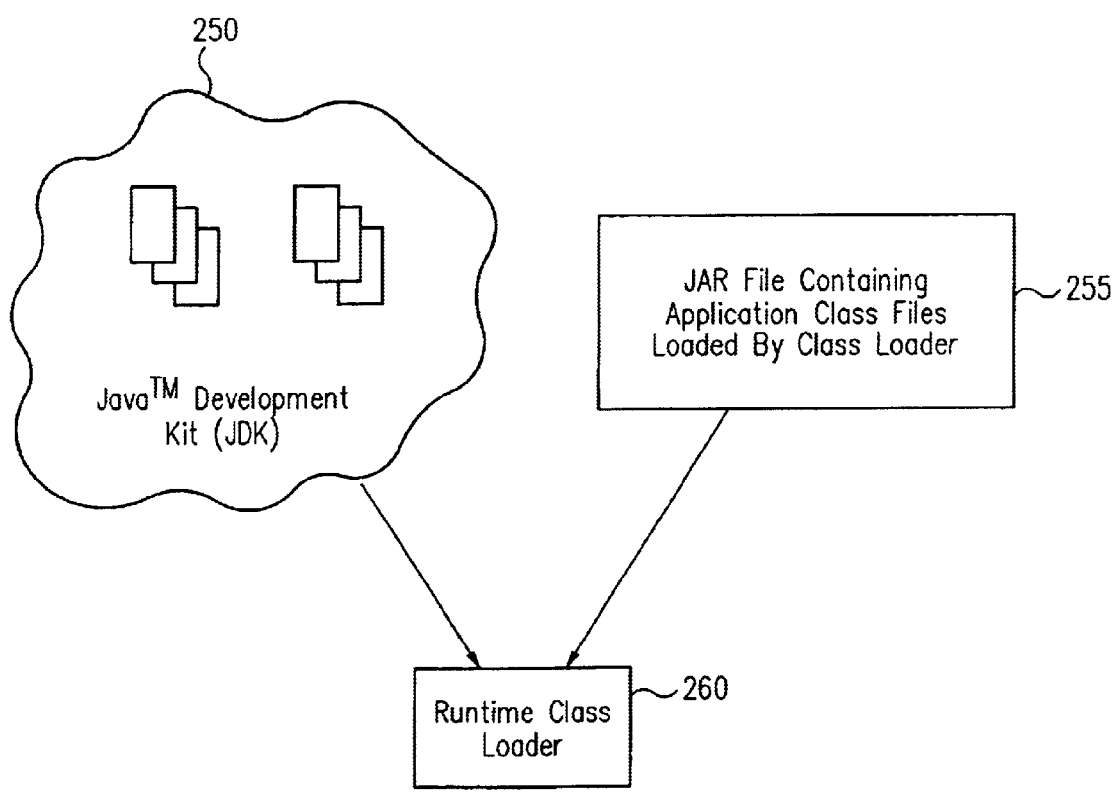
FIG. 11A is a block diagram that illustrates executing a dynamically loaded Java™ application in accordance with one embodiment of the present invention.

Turning now to FIG. 11A, a block diagram that illustrates executing a dynamically loaded Java™ application in accordance with one embodiment of the present invention is presented. The JAR file 246 created as illustrated in FIG. 10C serves as the input source for application class files. During execution of an application, system class files 250 and application class files from at least one JAR file 255 are loaded as needed by a runtime class loader 260. The format of a JAR file is described further with respect to FIG. 11B.

Figure 11B:
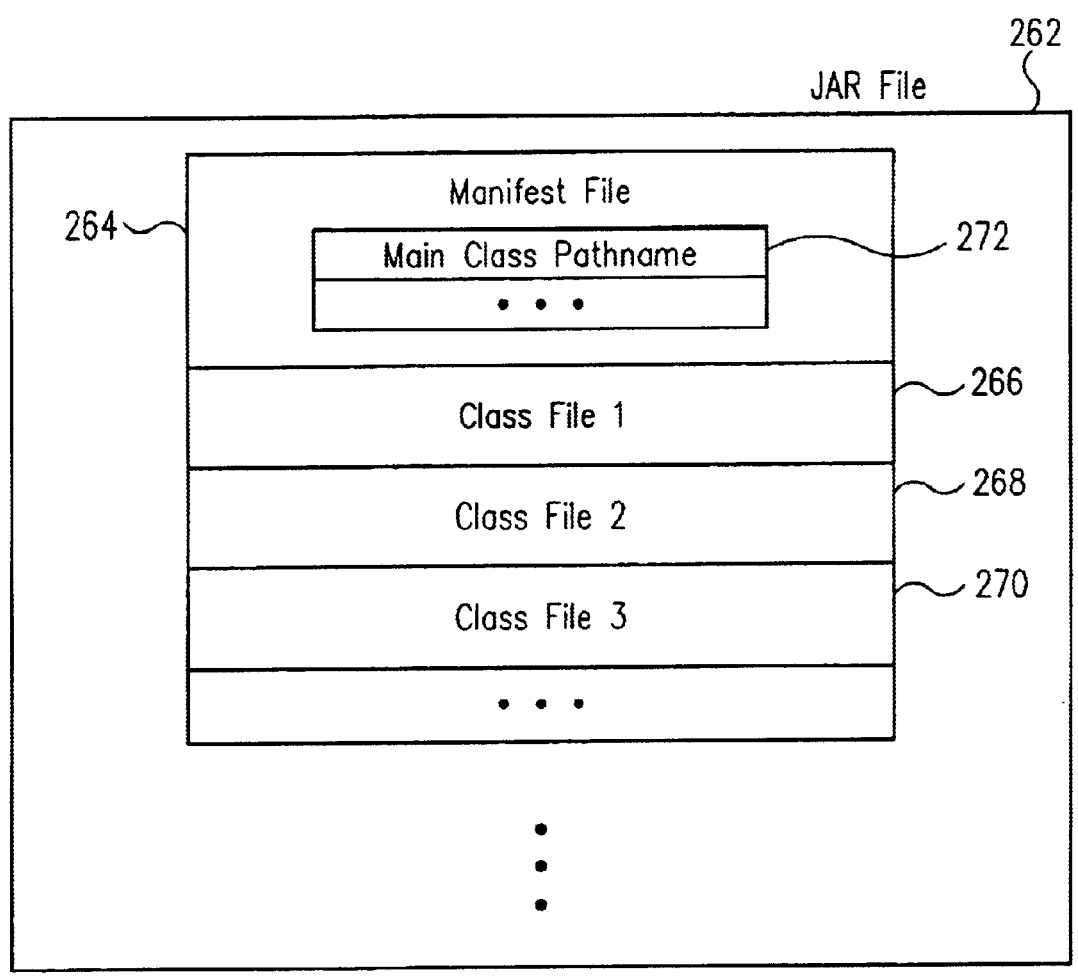
FIG. 11B is a block diagram that illustrates a JAR file representation in accordance with one embodiment of the present invention.

Turning now to FIG. 11B, a block diagram illustrating a JAR file representation in accordance with one embodiment of the present invention is presented. The JAR file 262 includes a manifest file 264 and at least one field for storing a class file 266, 268, 270. According to one embodiment of the present invention, the manifest file 264 includes a pathname for the main class file 272. When the runtime class loader is invoked with a JAR file input, the main class file pathname 272 found in the manifest file 264 is used to locate the main method, which is then loaded and executed. Additionally, application class files are loaded from the JAR file 262 during execution of the main method.

Figure 12:
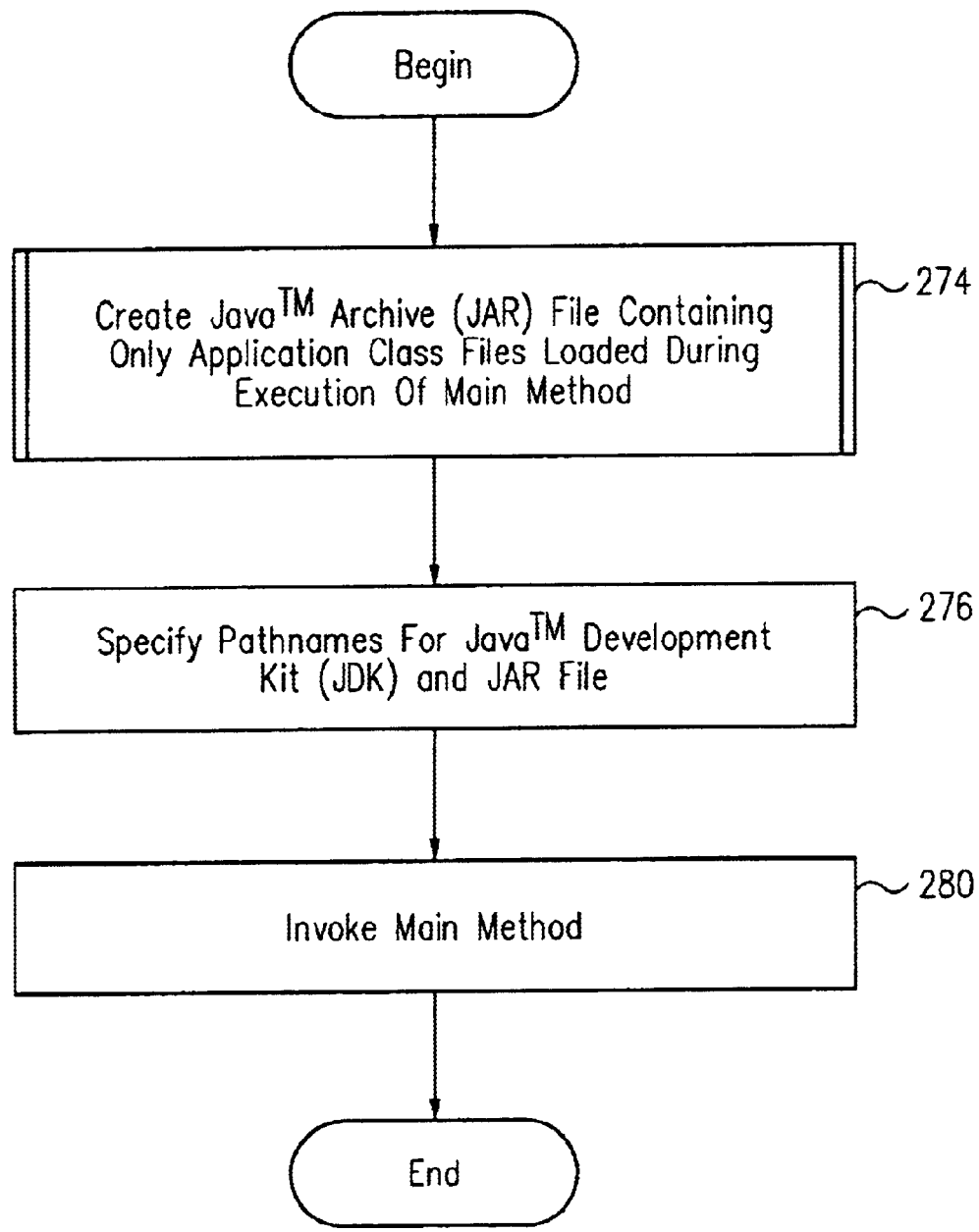
FIG. 12 is a flow diagram that illustrates executing a dynamically loaded Java™ application in accordance with one embodiment of the present invention.

Turning now to FIG. 12, a flow diagram that illustrates executing a dynamically loaded Java™ application in accordance with one embodiment of the present invention is presented. At reference numeral 274, a JAR file containing only application class files loaded during execution of the main method is created. At reference numeral 276, pathnames for the JDK and a JAR file are specified. At reference numeral 280, the main method is invoked, using the pathnames specified in reference numeral 276 as input sources for system class files and application class files.

Figure 13:
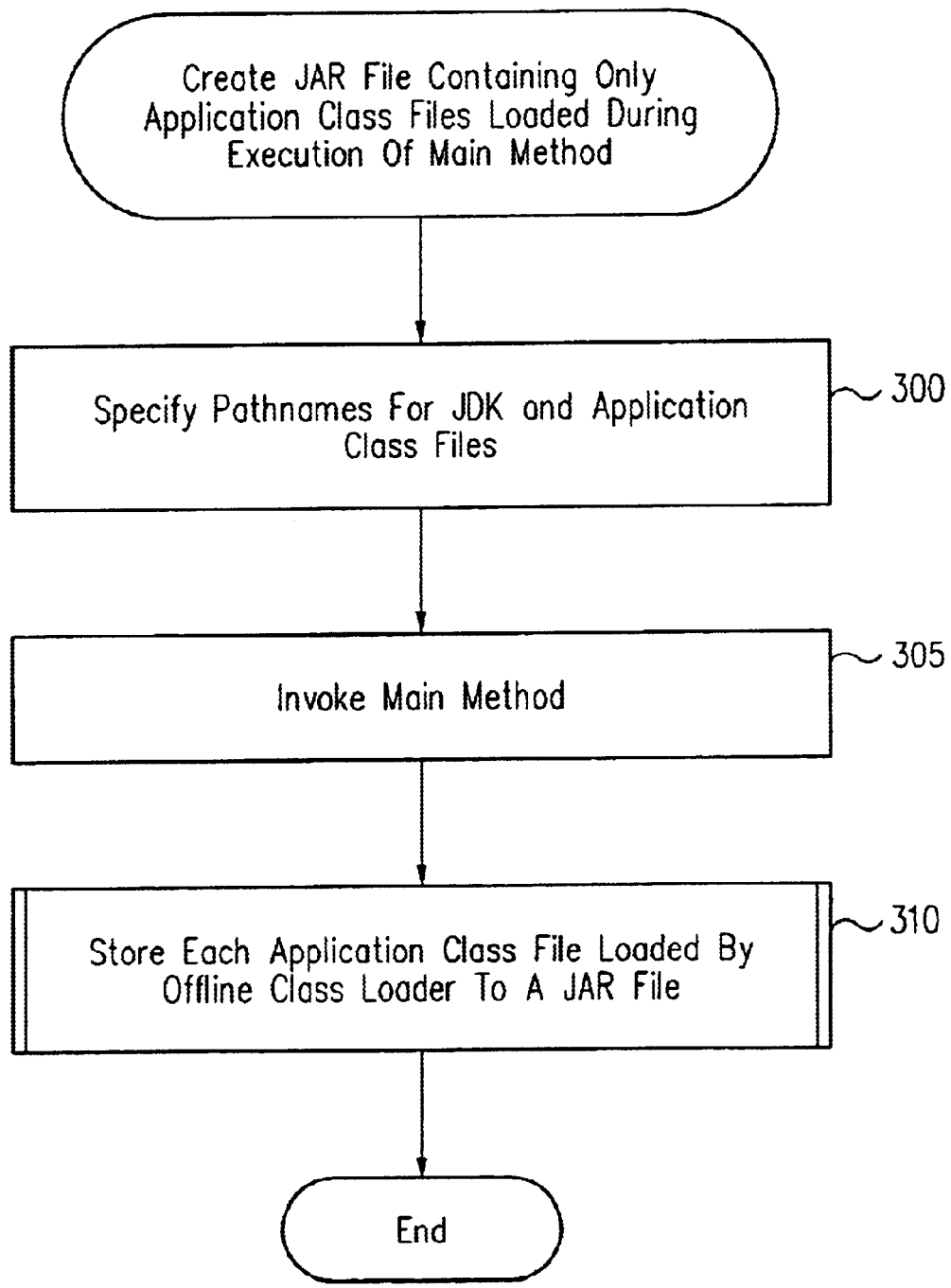
FIG. 13 is a flow diagram that illustrates creating a JAR file in accordance with one embodiment of the present invention.

Turning now to FIG. 13, a flow diagram that illustrates creating a JAR file in accordance with one embodiment of the present invention is presented. FIG. 13 provides more detail regarding reference numeral 274 in FIG. 12. At reference numeral 300, pathnames for the JDK and application class files are specified. At reference numeral 305, the main method is invoked. At reference numeral 310, each application class file loaded during execution of the main method is written to a JAR file.

Figure 14:
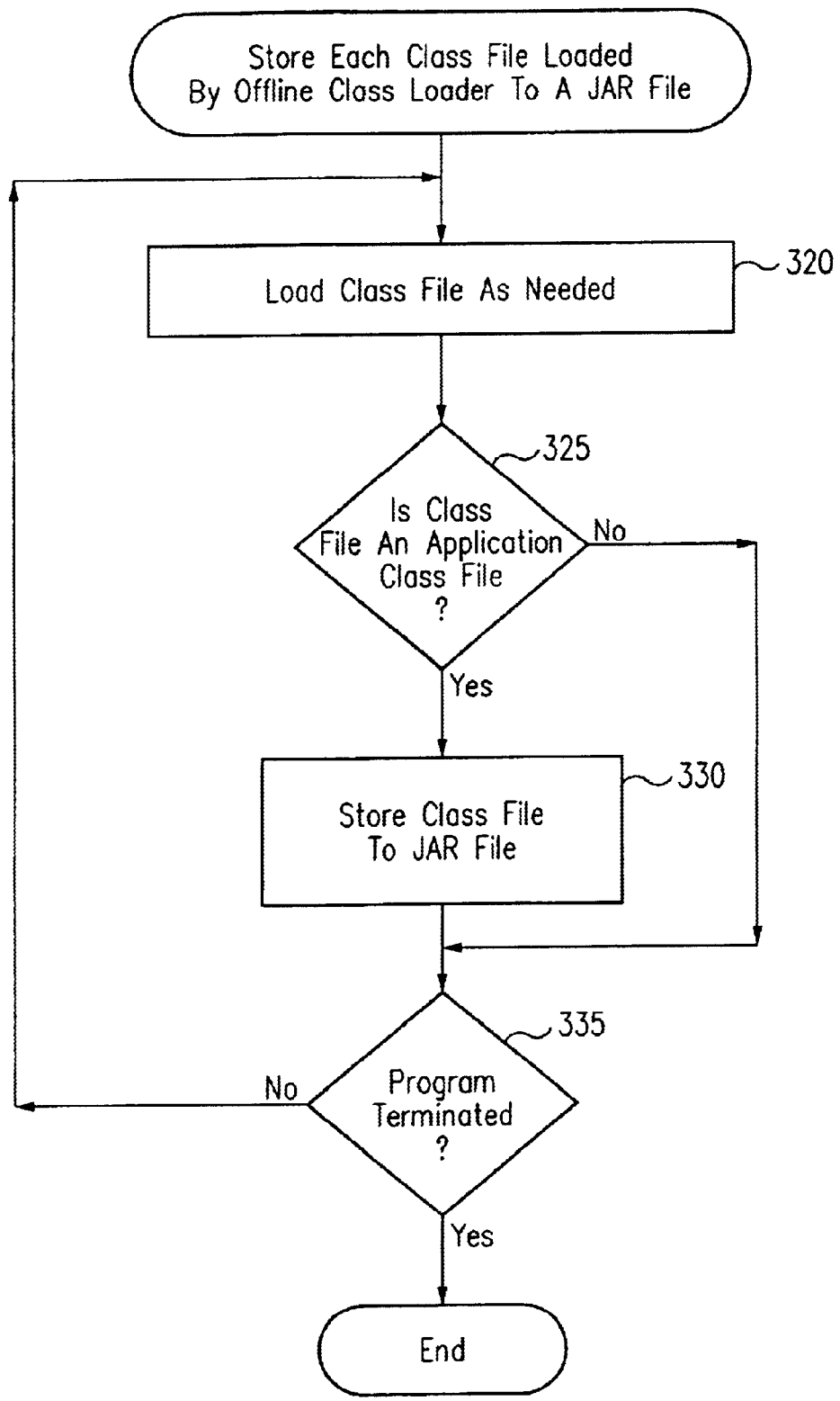
FIG. 14 is a flow diagram that illustrates storing loaded application class files to a JAR file in accordance with one embodiment of the present invention.

Turning now to FIG. 14, a flow diagram that illustrates storing loaded application class files to a JAR file in accordance with one embodiment of the present invention is presented. FIG. 14 provides more detail regarding reference numeral 310 in FIG. 13. At reference numeral 320, class files are loaded as needed during execution of the main method. At reference numeral 325, a determination is made regarding whether a loaded class file is a system class file. If the loaded class file is not a system class file, the class file is stored to a JAR file 255. At reference numeral 335, a determination is made regarding whether execution of the main method has terminated. If execution of the main method has not terminated, storing application class files to a JAR file continues at reference numeral 320.

According to one embodiment of the present invention, a list of application class files loaded during execution of a dynamically loaded program is used to optimize the application program. Application class files that are not expected to be required may initiate further investigation to determine whether the program files are required. If the unexpected application program files are not required, modifications may be made to other application class files to remove the reference to the unexpected class files, thus decreasing the memory footprint and increasing the execution efficiency of the application program. This embodiment is described further with reference to FIGS. 15A to 15B.

Figure 15A:
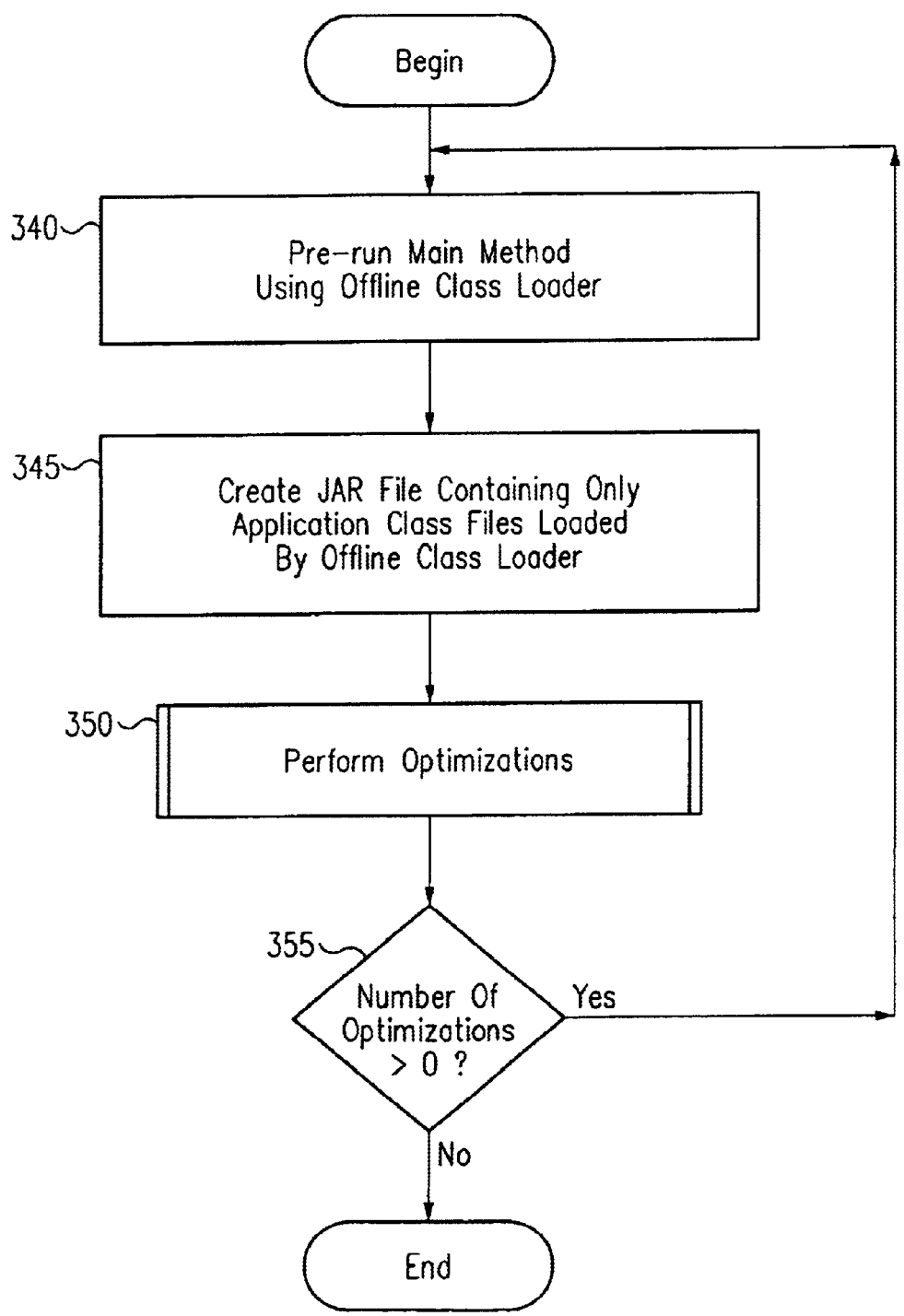
FIG. 15A is a flow diagram that illustrates optimizing a Java™ application in accordance with one embodiment of the present invention.

Turning now to FIG. 15A, a flow diagram that illustrates optimizing a Java™ application in accordance with one embodiment of the present invention is presented. At reference numeral 340, an application program is pre-run using an offline class loader. At reference numeral 345, the offline class loader creates a JAR file containing only application class files loaded by the offline class loader. At reference numeral 350, program optimizations are performed based upon whether the list of class files in the JAR file is expected.

Figure 15B:
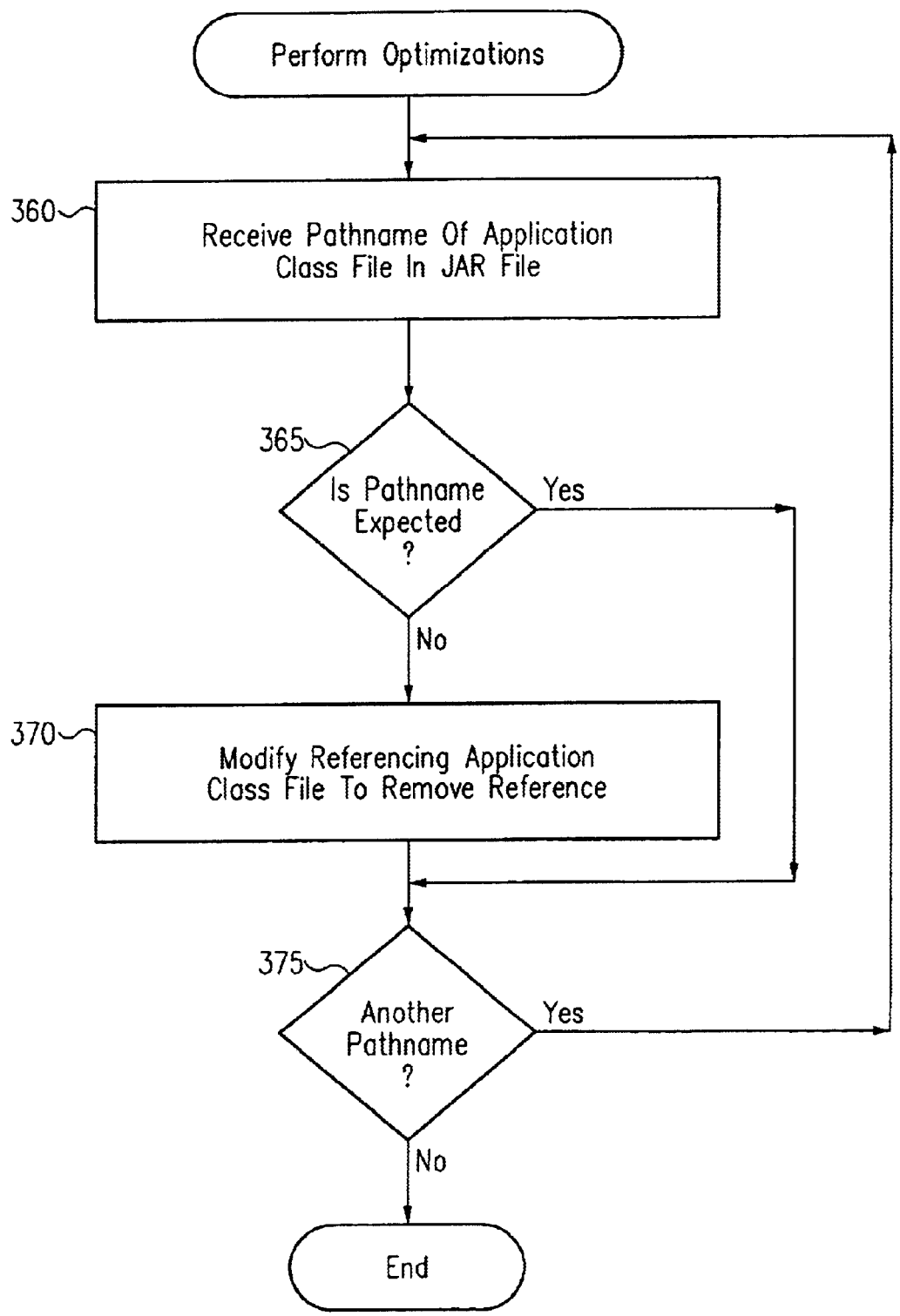
FIG. 15B is a flow diagram that illustrates performing optimizations in accordance with one embodiment of the present invention.

Turning now to FIG. 15B, a flow diagram that illustrates performing optimizations in accordance with one embodiment of the present invention is presented. FIG. 15B corresponds to reference numeral 350 in FIG. 15A. At reference numeral 360, a developer examines the pathname of an application class file included in the JAR file. If the developer determines pathname is expected (365), the next pathname is examined at reference numeral 360. The presence of an unexpected application class file indicates that during program execution, another program unit (the referencing program unit) referenced the unexpected application program unit (the referenced program unit). If the pathname is not expected, the developer removes the reference by first determining the referencing program unit and then modifying referencing program unit to remove the reference (370).

Although the method and system described herein has been described with reference to the Java™ programming language, it is applicable to computer systems using other object-oriented classes that utilize dynamic runtime loading of classes.

According to a presently preferred embodiment, the present invention may be implemented in software or firmware, as well as in programmable gate array devices, Application Specific Integrated Circuits (ASICs), and other hardware.

Thus, a novel method and apparatus for collocating dynamically loaded program files has been described. While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for executing a dynamically loaded program, said program including a main program unit, said method comprising:
   executing said main program unit a first time;
   creating at least one library file containing only application program files loaded during said first execution of said main program unit;
   specifying a system program file input; and
   executing said main program unit a second time using said system program file input and said at least one library file for dynamically loaded program files.

2. The method of claim 1 wherein said creating further comprises:
   specifying a first at least one pathname for system program files;
   specifying a second at least one pathname for application program files;
   executing said main program unit using said first at least one pathname and said second at least one pathname for dynamically loaded program files; and
   storing each application program file loaded during execution of said main program unit to said library file.

3. The method of claim 2 wherein said storing further comprises:
   loading a program file when referenced during execution of said main program unit;
   storing said program file to said library file when said program file is an application program file; and
   determining whether execution of said main program unit has terminated.

4. The method of claim 3 wherein said library file further comprises a compressed file.

5. The method of claim 1 wherein said program files comprise class files and archive files.

6. The method of claim 5 wherein said system program file input comprises a collection of services and libraries included in an execution environment.

7. The method of claim 6 wherein said library file comprises an archive file.

8. An apparatus for executing a dynamically loaded program, said program including a main program unit, said apparatus comprising:
   means for executing said main program unit a first time;
   means for creating at least one library file containing only application program files loaded during said first execution of said main program unit;
   means for specifying a system program file input; and
   means for executing said main program unit a second time using said system program file input and said at least one library file for dynamically loaded program files.

9. The apparatus of claim 8 wherein said means for creating further comprises:
   means for specifying a first at least one pathname for system program files;
   means for specifying a second at least one pathname for application program files;
   means for executing said main program unit using said first at least one pathname and said second at least one pathname for dynamically loaded program files; and
   means for storing each application program file loaded during execution of said in program unit to said library file.

10. The apparatus of claim 9 wherein said means for storing further comprises:
    means for loading a program file when referenced during execution of said main program unit;
    means for storing said program file to said library file when said program file is an application program file; and
    means for determining whether execution of said main program unit has terminated.

11. The apparatus of claim 10 wherein said library file further comprises a compressed file.

12. The apparatus of claim 8 wherein said program files comprise class files and archive files.

13. The apparatus of claim 12 wherein said system program file input comprises a collection of services and libraries included in an execution environment.

14. The apparatus of claim 13 wherein said library file comprises an archive file.

15. A program storage device readable by a machine, embodying a program of instructions executable by the machine to perform a method to execute a dynamically loaded program, the method comprising:

executing said main program unit a first time;

creating al least one library file containing only application program files loaded during said first execution of said main program unit;

specifying a system program file input; and executing said main program unit a second time using said system program file input and said at least one library file for dynamically loaded program files.

16. The program storage device of claim 15 wherein said creating further comprises:

specifying a first at least one pathname for system program files;

specifying a second at least one pathname for application program files;

executing said main program unit using said first at least one pathname and said second at least one pathname for dynamically loaded program files; and storing each application program file loaded during execution of said main program unit to said library file.

17. The program storage device of claim 16 wherein said storing further comprises:

loading a program file when referenced during execution of said main program unit;

storing said program file to said library file when said program file is an application program file; and determining whether execution of said main prom unit has terminated.

18. The program storage device of claim 17 wherein said library file further comprises a compressed file.

19. The program storage device of claim 15 wherein said program files comprise class files and archive files.

20. The program storage device of claim 19 wherein said system program file input comprises class files and archive files.

21. The program storage device of claim 20 wherein said library file comprises an archive file.

22. A method for representing a library file, said method including:

storing in at least one program unit field the pathname of every application program unit loaded during the execution of a dynamically loaded program, said dynamically loaded program including a main program unit; and storing in a main unit field the pathname of said main program unit.

23. The method of claim 22 wherein said program unit field and said main unit field are contained within an archive file; and said main unit field comprises a manifest file.

* * * * *